455/12

United States Patent

[11] 3,564,147

[72] Inventors John G. Puente; Richard B. McClure, Rockville, Md.; George D. Dill, Vienna, Va.; Eugene R. Cacciamani, Washington, D.C.; Andrew M. Walker, Alexandria, Va.; William G. Schmidt, Rockville, Md.

[21] Appl. No. 719,138
[22] Filed Apr. 5, 1968
[45] Patented Feb. 16, 1971
[73] Assignee Communications Satellite Corporation

[54] LOCAL ROUTING CHANNEL SHARING SYSTEM AND METHOD FOR COMMUNICATIONS VIA A SATELLITE RELAY
17 Claims, 19 Drawing Figs.

[52] U.S. Cl. .......... 179/15; 325/4
[51] Int. Cl. .......... H04j 1/14
[50] Field of Search .......... 325/4, 39, 40, 54, 57, 58, 15 (SAT), 3; 343/176, 200; 179/15, 15 (SIG), 15 (ATI), 15 (AS), 15 (Async), 15 (APR), 15 (MM)

[56] References Cited

UNITED STATES PATENTS

| | | | |
|---|---|---|---|
| 3,261,922 | 7/1966 | Edson .......... | 179/15sig |
| 3,363,180 | 1/1968 | Geissler .......... | 325/4 |

*Primary Examiner*—Ralph D. Blakeslee
*Attorney*—Sughrue, Rothwell, Mion, Zinn and Macpeak

ABSTRACT: A demand assigned multiple access system provides for the sharing of satellite circuits by a large number of terrestrial users. Demand assignment of satellite circuits is especially useful and efficient to the developing nations as compared to preassignment of satellite circuits, since they have a low number of call minutes per day. Terrestrial transmissions are FDM multiplexed through the satellite on a single channel or carrier, and since no carriers are preassigned between specific terrestrial locations, any ground station may select any one of the carriers available in the entire system, provided that carrier is not presently in use. A common TDM channel is used at all terrestrial locations for maintaining a record of the carriers used and requested by all locations.

INVENTORS
JOHN G. PUENTE
ANDREW M. WALKER
GEORGE D. DILL
RICHARD B. McCLURE
EUGENE R. CACCIAMANI
WILLIAM G. SCHMIDT

BY Sughrue, Rothwell, Mion, Zinn & Macpeak
ATTORNEYS

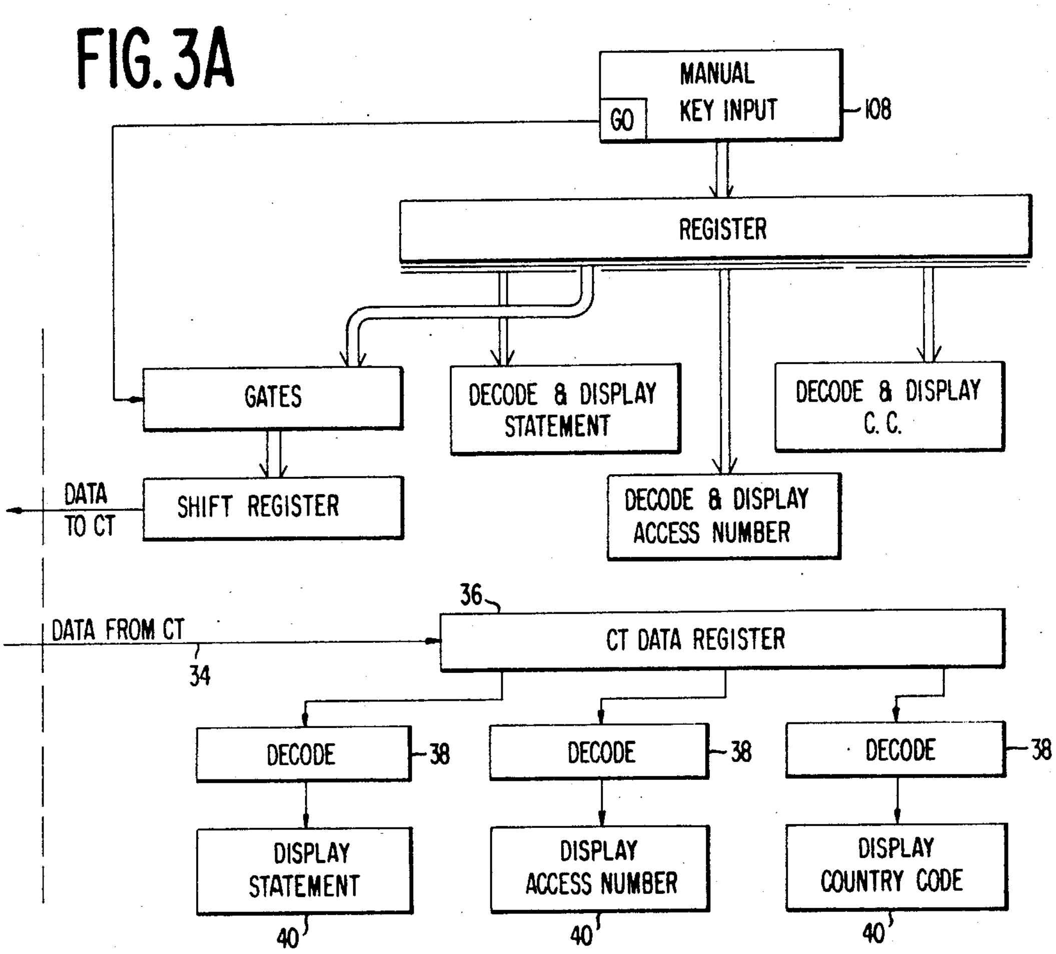
FIG. 3A
FIG. 5A
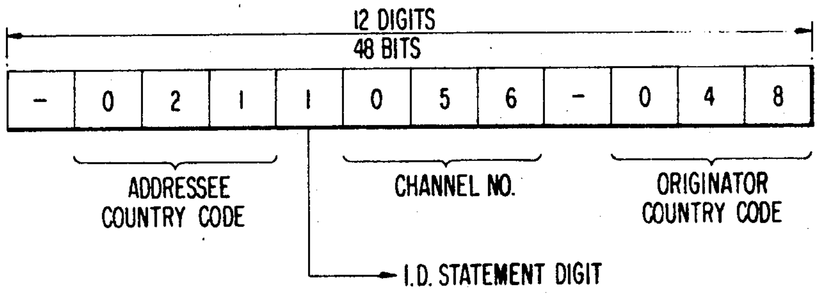
| STATEMENT | BCD DIGIT |
|---|---|
| REQUEST | 1 |
| CHANNEL STATUS | 0 |
| CONFIRM | 2 |
| RELEASE | 3 |
| BUSY | 4 |
FIG. 5B

| CHANNEL # | SYNTH CODE | CARRIER TX SYNTH | MIXER INPUTS R SYNTH |
|---|---|---|---|
| 1 | 14 AC | 48.55 MHz | 50.55 MHz |
| 2 | 24 AC | 48.65 | 50.65 |
| 3 | 34 AC | 48.75 | 50.75 |
| 4 | 15 AC | 48.85 | 50.85 |
| 5 | 25 AC | 48.95 | 50.95 |
| 6 | 35 AC | 49.05 | 51.05 |
| 7 | 14 BC | 49.15 | 51.15 |
| 8 | 24 BC | 49.25 | 51.25 |
| 9 | 34 BC | 49.35 | 51.35 |
| 10 | 15 BC | 49.45 | 51.45 |
| 11 | 25 BC | 49.55 | 51.55 |
| 12 | 35 BC | 49.65 | 51.65 |
| 13 | 14 AD | 49.75 | 51.75 |
| 14 | 24 AD | 49.85 | 51.85 |
| 15 | 34 AD | 49.95 | 51.95 |
| 16 | 15 AD | 50.05 | 52.05 |
| 17 | 25 AD | 50.15 | 52.15 |
| 18 | 35 AD | 50.25 | 52.25 |
| 19 | 14 BD | 50.35 | 52.35 |
| 20 | 24 BD | 50.45 | 52.45 |
| 21 | 34 BD | 50.55 | 52.55 |
| 22 | 15 BD | 50.65 | 52.65 |
| 23 | 25 BD | 50.75 | 52.75 |
| 24 | 35 BD | 50.85 | 52.85 |

LOCAL ROUTING CHANNEL SHARING SYSTEM AND METHOD FOR COMMUNICATIONS VIA A SATELLITE RELAY

BACKGROUND OF THE INVENTION

In communications systems which provide transmission and reception of more than a single message, some form of multiplexing is used. In the prior art, FDM (frequency division multiplexing) used for satellite communications, and also in that used for nonsatellite communications, the frequencies (referred to hereinafter as carriers or channels) are preassigned for use in communicating between two locations. Thus, Country A may have 10 carriers assigned to it out of which five are assigned for communication with Country B, three are for communications with Country C, and one apiece for communications with Countries D and E, respectively. The channel assignment is made on the basis of expected traffic between countries and once a channel is assigned between any two countries its availability becomes limited to those two countries. The preassignment of channels may be sufficient for communication systems in which all countries within the system have sufficiently heavy traffic. However, for the developing nations, which will not have very heavy traffic in the near future, a preassigned communications network becomes very inefficient. For example, present international standards assign a single channel between two countries if the expected traffic between those two countries is 150 minutes per day. Thus, if the traffic is at the minimum of 150 minutes per day, and the channel is assigned between the aforesaid two countries, then the assigned channel will not be used for 21-1/2 hours during the day. If a substantial number of channels assigned to these minimum traffic routes there is a tremendous waste of the satellite bandwidth resulting in inefficient operation.

By going to a sharing system in which the channels are not preassigned but may be taken by any ground location on demand, the overall efficiency of the satellite system can be greatly improved. It can be shown that the same blockage efficiency is achieved in a demand assigned system as in a preassigned system with a savings of 67 percent of the channels. A prior proposal exists for implementing a demand assignment scheme for satellite communications. However, in accordance with the prior proposed a single station has control over all channel routing and assignment. Thus, even though Country A may desire to communicate with Country B, the requesting country must request a channel from the location (which may be Country C) which handles all requests. In an international communications system, control of traffic between two countries by a third country is to be avoided wherever possible. In accordance with the present invention, each station has the capability of recording the status of all channels in the entire communications community and also each station handles its own requests.

SUMMARY OF THE INVENTION

In accordance with the present invention, each earth station periodically sends out a burst signal containing information about the channels presently being used, requested, or released by its own ground location. The bursts are transmitted via a single channel, referred to as the common routing channel, and are time division multiplexed (TDM) to arrive at the proper times at the satellite and at all ground stations. The bursts from each station are received by all stations and the data of all channels available in the entire system is memorized and continuously updated at each station. If a subscriber at Country A requests to communicate with a subscriber at Country B, and if an access circuit is available at Country A, a presently unused channel is selected at Country A and a request for this channel and for the ability to communicate to Country B is sent via the common routing channel. The burst message containing this request passes through the satellite and is transponded to all earth stations within the designated community including the earth station originating the message. When the originating earth station receives back its own burst in which it made a request for the selected channel, the message is examined to see if the requested channel is still available. The purpose of examining whether or not the requested channel is still available is to prevent the problem of double seizure of a channel. In other words, it is possible for Country A to select a channel subsequent to the time that Country C has requested the same channel but prior to the time that Country A receives a burst from Country C informing Country A that the channel has been requested. However, in accordance with the present invention, the channel is not seized until the request goes through the satellite and back to the requesting station. During the time it takes for the round trip transmission through the satellite, if another ground station had first requested the same channel this will be noted by ground station A, and when its own request comes back through the satellite an indication will be provided that the requested channel has become busy. Assuming that the requested channel is not busy, the channel frequency is seized by connecting it to the modulator unit. The subscriber is then provided with a channel through which he can communicate with someone at Country B.

At the addressee station, Country B, the request from Country A is noted and an examination of the requested channel is undertaken to see if it is presently used or unused. Assuming that the requested channel is presently unused, and further that Country B has an available access circuit, Country B will transmit via its TDM burst a message which names Country A as the addressee and which confirms to the addressee country that the request has been received and is acceptable.

In the telephony art, a communication circuit between two locations comprises a pair of channels. One channel is used for transmission from the first to the second location and a different channel is used for transmission from the second to the first location. This holds true in satellite communications of the FDM type. Thus, although station A, as described above, has picked a channel for transmitting messages to the station B, station B has yet to pick a channel for transmitting messages to station A, thereby forming the communication circuit. One method for selecting a channel at the call recipient station, station B, would be to select an available channel in the same manner that A selected an available channel. In accordance with that procedure, the channels forming a circuit would be essentially independent of one another, the two stations at the end points of the circuit selecting their own transmission channels.

A different method, and the one described herein by way of example only, is that of pairing the channels. For example, let us assume that there are 24 transmission channels available in the entire system and channels 1 thru 12 are paired respectively with channels 13 thru 24. In the case of paired channels, as indicated, the requesting station selects one channel of the pair and the recipient station then necessarily selects the other channel of the pair. For example, if station A makes a request for channel number 2, it will transmit information to station B on channel number 2 and station B will transmit its information to station A on channel number 14. By using a paired channel arrangement, it is only necessary to continually store the status of half of the channels in the system, since the other half will always have corresponding status, i.e., if channel 2 is indicated as being busy then necessarily channel 14 will also be busy. However, in the detailed description to follow, apparatus will be shown for storing the status of all channels, even though it may only be necessary to have half as many storage locations as there are channels. It should be noted that in accordance with the present invention communications are provided on a single carrier per channel.

BRIEF DESCRIPTION OF THE DRAWINGS

FIGS. 3*a* through 3*c* are block diagrams illustrating an example of a demand assigned switching and signaling subsystem which is a portion of the specific embodiment of the present invention.

FIG. 5*a* illustrates an example of the format of information transmitted via the common routing channel, and FIG. 5*b* illustrates the different possible identification statement digits which may be sent via the common routing channel.

DETAILED DESCRIPTION OF THE DRAWINGS

Figure 1:
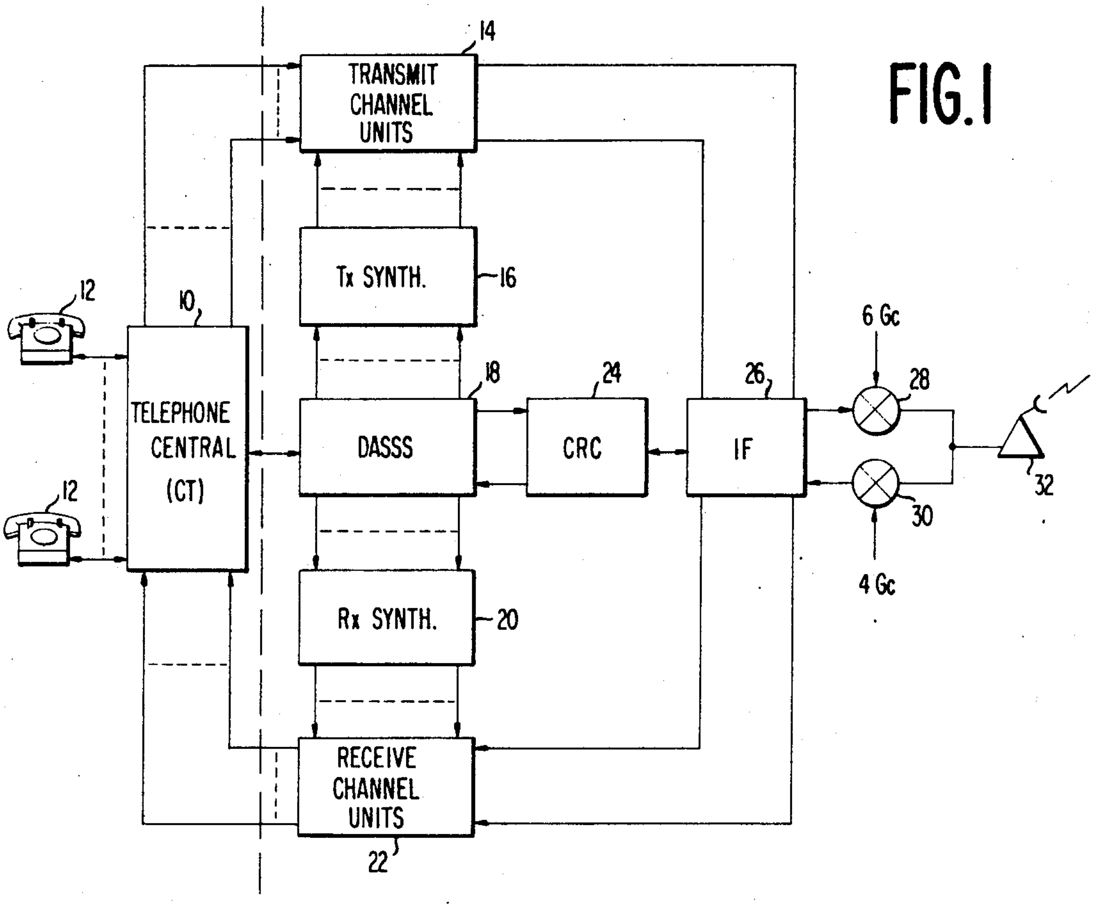
FIG. 1 is a block diagram of a preferred embodiment of the present invention.

In FIG. 1 there is shown a general block diagram of the apparatus at a single location for use in carrying out the method of the present invention. It is assumed that all other stations operating in the demand assignment mode have similar apparatus. It should be noted that the block to the left of the dashed line, the telephone central 10, itself forms no part of the present invention but is illustrated herein only to provide a complete picture of the operation by which a call is made or received at a single ground location. In order to provide an example for ease of description it is assumed that there are 50 countries involved, each having a single earth station, and each earth station being as shown in FIG. 1. It will be apparent to those skilled in the art that the units shown in FIG. 1 are not necessarily at the same physical location but may be many miles apart. Also, the initiating earth station, that is the earth station wherein a call is initiated, will be referred to as station A and the earth station to which a call is being made will be referred to as station B. It is further assumed that there are 24 channels, and thus, 24 carrier frequencies, available in the entire system for the transmission of information. It is further assumed, as is presently the case in commercial satellite communications, that all carriers are translated up to 6 Gc region for transmission to the satellite and that the satellite translates the received frequency into a 4 Gc region, the latter frequencies being received by all earth stations.

The function of a telephone central and telephone centrals per se are well known in the art and they constitute the location and/or apparatus wherein calls are received and routed. The calls are indicated by the telephones 12 connected to the CT. The present invention is in no way concerned with the manner of CT operation but operates to pick an available channel when a request is made for one by a subscriber via the CT and to provide a circuit between subscribers at different ground locations. Although many present day CTs are automatic, an understanding of the present invention will be had if the CT is assumed to be manually operated. It will be apparent to anyone of ordinary skill in the art that the CT operations may be automatic. The only operation of the CT that will be described at all will be that necessary to understand the cooperation between the invention and the CT. Furthermore, although for purposes of setting forth an example a particular format of the data sent from the CT will be described, it will be apparent to anyone of ordinary skill in the art that the present invention does not depend upon a format by which information is transferred between the CT and the switching and signalling subsystem of the present invention.

Furthermore, in its broadest aspect, the invention could operate with the telephones connected directly to the receive and transmit channel units on a one-for-one basis. However, as a practical matter there will be more subscribers than there are channel units and, thus, it will be necessary to go through a CT of a type presently used in telephony operations for connecting a subscriber to an access line, which in turn is directly connected to the transmit and receive channel units.

Each station includes a number of channel units, which include digitizer, control logic and modulator units on the transmit side and cooperating demodulator, control logic, and decoder units on the receive side. The number of channel units depends upon the expected traffic to be handled by the earth station. Thus, for example, a low traffic earth station may have only a single channel unit whereas a high traffic earth station may have a large multiple of channel units. The term channel unit should not be confused with the term "channel" or "channel number." The former refers to transmission and receive units whereas the latter refers to the carrier frequencies selected for operating the transmission and receive units. Thus, for example, if a particular earth station has 10 channel units, and assuming there are 240 channels or carrier frequencies in the entire communications system, then any one of the channel units may operate on any one of the carrier frequencies. In this way, all of the channels may be used by the aforesaid earth station but only 10 of the channels may be used simultaneously since there are only 10 channel units. There is, of course, a separate input line, referred to hereafter as access line, to each channel unit, and an access line is selected by the CT and in a manner well known in the art. Thus, voice communications from a subscriber 12 pass through the CT switching terminal 10 and to an access line wherein it is applied to one of the transmit channel units 14 on the transmit side of the station. In a preferred embodiment the voice information is digitally coded for PSK modulating a selected carrier (channel). As an example, 2-phase PSK modulation, as is well known in the art, provides an output carrier frequency which varies in phase between 0° and 180° depending on the binary level of the input digital information. In the 10 channel unit system, 10 conversations can be handled simultaneously. On the receive side of the earth station, the PSK modulated communications are applied to the channel units and demodulated and converted back into analogue signals. The voice output from a channel unit is applied to the subscriber 12 via CT 10.

A transmit frequency synthesizer 16 and a receive frequency synthesizer 20 are provided at each earth station to generate all of the carrier frequencies. There is one output from the frequency synthesizer for each channel unit. Upon command from the demand assigned switching and signalling subsystem 18 (DASSS), to be described more fully hereafter, the transmit synthesizer is commanded to send a carrier frequency to the selected channel unit 14 and the receiver synthesizer 20 is commanded to send a selected mixer frequency to the receive channel unit 22. The frequencies out of the transmit synthesizer 16 are the actual carrier frequencies and they are applied to the carrier inputs of the PSK modulators within the transmit channel units 14. As an example, assume that the subscriber is connected to transmit and receive channel unit 1 and that the selected channel frequency is channel 3. Under these circumstances, the DASSS commands the transmit synthesizer 16 to send the carrier frequency corresponding to channel 3 to the PSK modulator in the first channel unit. Thus, the digitized information will go out of the channel unit on the selected carrier. Since channel 3 was selected, the system knows that it will receive information from station B on the paired channel which, in this case, is channel 15 (assuming there are 24 channels). In order to receive the carrier corresponding to channel 15 and demodulate and decode that information in channel unit 1, the DASSS commands the receive synthesizer 20 to send a selected frequency to a mixer which is in the channel unit. It will be noted that the frequencies generated by the receive synthesizer are not identical to the carrier frequencies which the channel units will receive, but differ from the carrier frequencies, respectively, by a selected detector frequency. Thus, if the detector frequency is assumed to be 2MHz, then DASSS commands the receive synthesizer 20 to send a frequency to the mixer within the channel unit, which frequency is 2MHz greater than the channel frequency with it wants to receive from station B.

Figure 2:
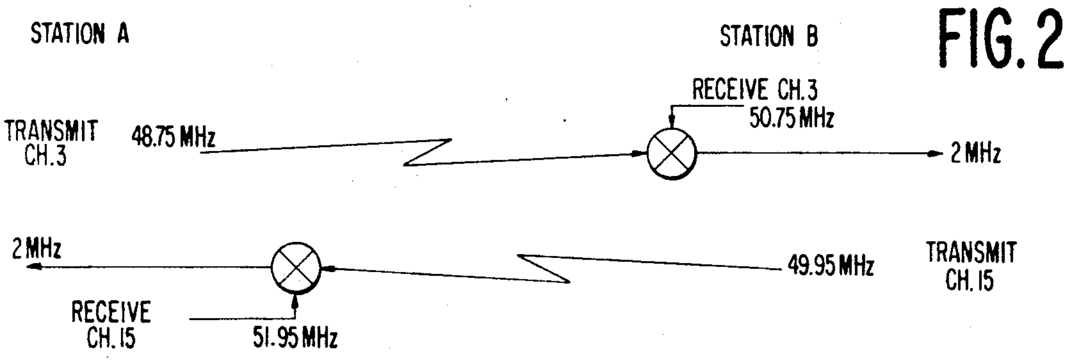
FIG. 2 is a diagrammatic illustration of the paired relationship between channels as used in a preferred embodiment of the present invention.

The latter operation is shown diagrammatically in FIG. 2, using a specific set of frequencies as an example. As will be explained in more detail hereafter, the mixer outputs pass through narrow band filters (not shown in FIG. 1) centered at 2MHz, thus enabling the channels to effectively receive only the desired carriers. The 2MHz IF carriers are then demodulated and decoded to provide the voice information to the subscriber. In the synthesizer 16 and 20 frequency separation between carriers can be varied by replacing a set of crystals. All frequencies are generated by a straight forward mixing and filtering operations. An alternative method would be to use a separate synthesizer per modem.

As mentioned above, although communications is provided on a frequency division multiplexing basis, the frequency or channel selection is provided via a separate TDM channel referred to as the common routing channel. The apparatus for selecting an available channel and for remembering the status of all channels within the system comprises a demand assigned switching and signalling system 18 (DASSS) and a common routing channel apparatus 24 (CRC). The CRC apparatus controls the time at which the station transmits a burst to the satellite, and also receives and transfers to DASSS the received bursts from all stations. DASSS decides upon the routing information to be placed in the transmitted burst and processes the routing information contained in the received bursts and stores the condition of every channel within the total pool of channels. When a subscriber initiates a call, this information is relayed to DASSS and then transmitted via the station burst in the form of a request for the presently available channel, an indentification of the addressee country and a notification of the originator station. When its own request is received, and provided that the requested channel is not in use, outputs from DASSS control the sythesizers as indicated above.

When DASSS is on the receive end of a call it responds to a request statement in which it is identified as the addressee. The response includes checking the requested channel to see whether or not it is busy, selecting a channel unit if one is available, commanding the receive synthesizer to generate the proper mixer frequency to receive the requested channel frequency, and commanding the transmit synthesizer to generate the paired channel frequency. DASSS also causes the CRC to send out a confirm statement to station A, via the station B TDM burst.

On the transmit side of the apparatus, the modulated carrier frequencies, one from each operating transmit channel unit, are applied to an IF subsystem 26 wherein the frequencies along with the common routing channel frequency are combined on a single line 187 resulting in a spectrum of modulated frequencies, which in a specific example, will be centered around 50 MHz. At the IF subsystem, the 50 MHz spectrum is mixed with a locally generated 120 MHz signal, thereby translating the entire carrier spectrum to the 70 MHz region. The latter spectrum of modulated frequencies is transmitted to the ground antenna station wherein the spectrum is translated up to the 6 GHz region for transmission to the satellite. The satellite receives the frequencies, and as is the case in the prior art, translates the frequency spectrum to the 4 GHz range for transmission back to all of the ground stations wherein they pass through the antenna unit 32 and through the receive mixer unit 30 to the IF subsystem 26. The receive mixer 30 operates to translate the received spectrum down to the 70 MHz region for application to the IF subsystem. In the IF subsystem, the received spectrum of frequencies, centered around 70 MHz, are again mixed with a locally generated 120 MHz signal for translating the frequency spectrum down to the original 50 MHz region. It will be noted that although the actual frequency which carries the modulation from the ground antenna to the satellite and from the satellite back to the ground antenna is in the 6 and 4 GHz region, the carrier separations are determined by the carrier separations at the synthesizer outputs.

Figure 3B:
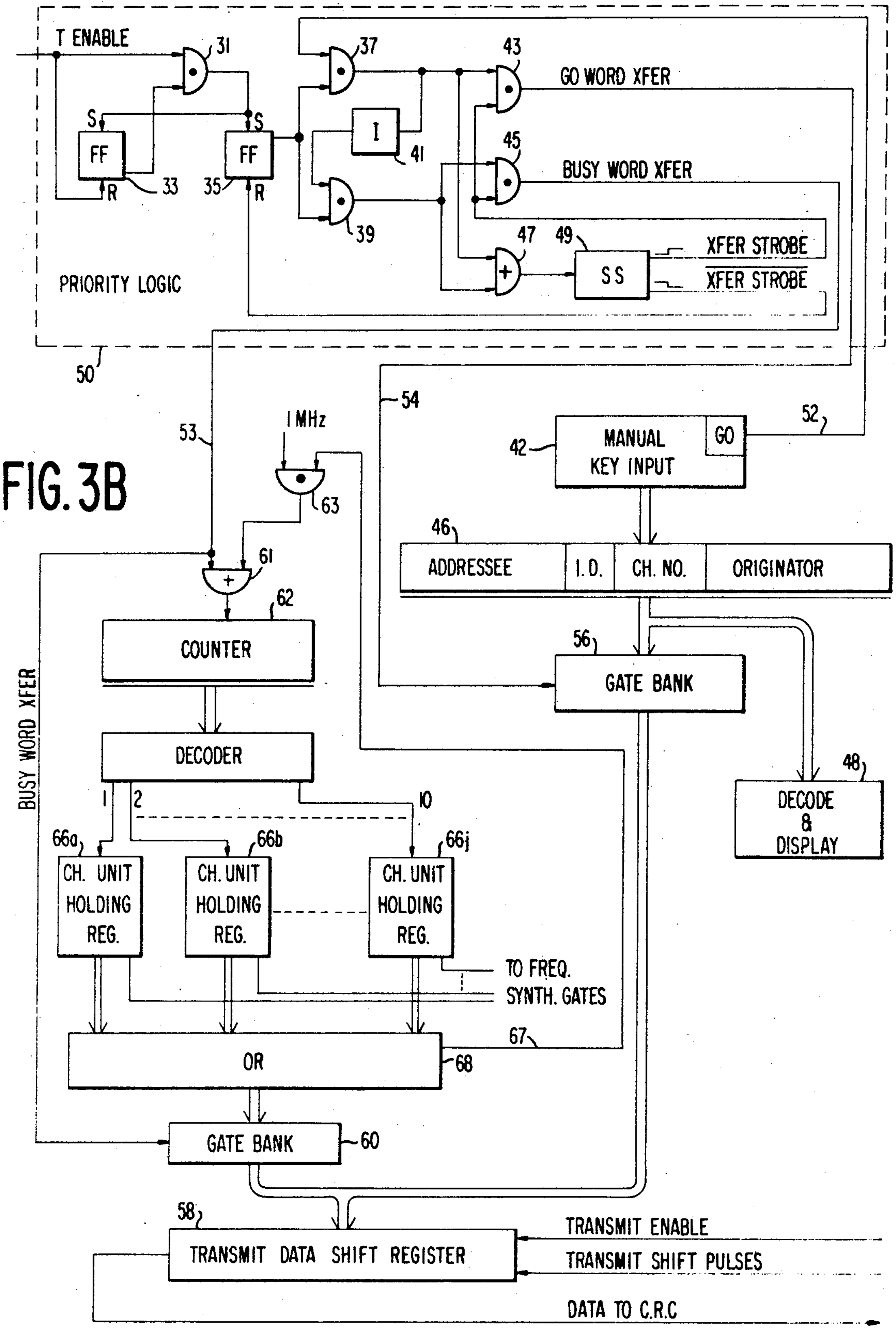
Figure 3C:
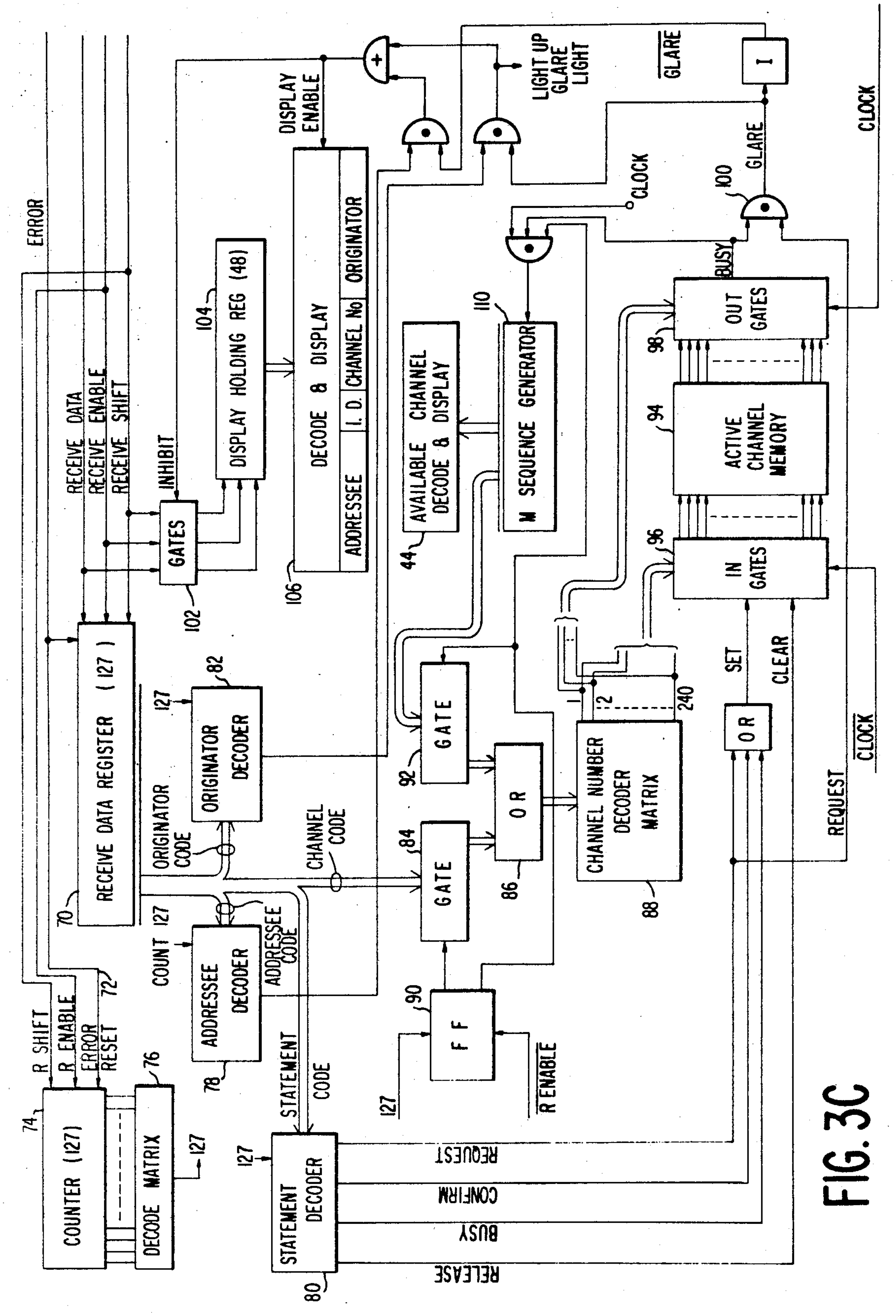

A functional block diagram of the DASSS unit is shown in FIGS. 3*a*, 3*b*, and 3*c*. The functional block diagrams illustrate the manual mode of DASSS operation, that is, the mode in which an operator visually observes requests and manually keys in requests and other information to be sent out to the satellite. Although the mode to be described in connection with the drawings will be the manual mode, it will be apparent to anyone of ordinary skill in the art that the entire DASSS operation may be made automatic, thereby removing the need for a monitor. Furthermore, since the DASSS operation is essentially one of storing and processing information, given the teachings of the present invention, a skilled computer programmer could program a general purpose computer to carry out the unique function of DASSS.

CALL INITIATED AT STATION A

Figure 4:
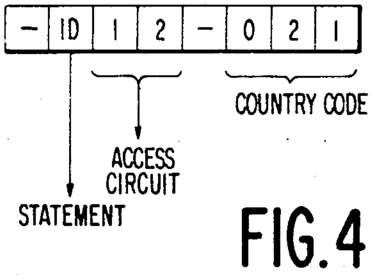
FIG. 4 illustrates a suggested format for information transferred along a data link between the telephone central and the demand assigned signaling and switching subsystem of the present invention.

When a subscriber call is initiated at a local station, the CT selects an access line for connection to one of the channel units and informs DASSS that a call is being initiated, the access line selected (corresponds to the channel unit number) and the country which the subscriber wishes to call. The format of the information transferred to DASSS is unimportant to the present invention. However, for purposes of providing an example, it will be assumed that the format between the CT and DASSS is as indicated in FIG. 4. Each segment in the format message represents a single BCD digit (four binary bits). The first digit is blank, the second digit is an identification statement, the next two digits identify the access line or channel unit to which the subscriber is connected, the following digit is blank, and the next three digits represent a country code (country codes are defined in CCITT, CCIR World Plan Committee, Contribution No. 15 "Worldwide Telephone Numbering Plan," May 8, 1967). There are four statement ID digits which may pass between DASSS and the CT. These digits may be 0 through 4 and represent respectively, call initiate, connect, complete, busy and disconnect. The latter information is received from the CT via line 34 (FIG. 3*a*) and applied to an 8 digit, 32 bit shift register, 36, which holds the received information. The latter information is decoded by binary decode matrix 38 and applied to visual display units 40 which display, respectively, the ID statement, the access line selected, and the country code of the country with which the subscriber wants to communicate.

As pointed out above, in the hypothetical but improbable case in which the number of subscribers is equal to the number of channel units available, there would be no need for the CT and thus there would be no need for DASSS to be informed of the access line selected. Also, assuming that the CT is manually operated, the received information may be generated at the CT by manually keying it into a transmit register via a digital key-to-BCD converter.

The operator, seeing the display, then operates a manual key input 42 (FIG. 3*b*) to cause DASSS to send a request to the addressee country. The operator manually keys in the following information on a device which may be a standard manual key to BCD code apparatus: the country code of the addressee; a statement identification, which in this case is a 1-digit code indicating that a request is being made; a selected channel number; and, the country code of the originator station. The selected channel number is the one seen by the operator displayed on the available channel decode and display device 44 (FIG. 3*c*). The channel number displayed is that of an available channel.

The manually keyed BCD data from the manual key input 42 enters into a 48 bit, 12 digit input register 46. The format of the information in the register is illustrated in FIG. 5*a* with each section representing a single digit. An example of the different ID statements which are transmitted from DASSS at one station and received by DASSS at other stations is illustrated in FIG. 5*b*. Thus, as an example, whenever a request for a channel is to be made, the digit BCD 1 is entered into the fourth digit position (the statement digit position) of the input register 46.

The ID statement codes transferred between ground locations should not be confused with the ID statement codes transferred back and forth between the CT and the DASSS at any one ground location. The latter statement codes are also 1 BCD digit identification codes but they represent different sequences in the procedure.

Referring back to the sequence of operations, the operator has entered data corresponding to the addressee, an ID statement request, a selected available channel number, and the originator country code in the input register 46. The data in the register may be decoded and displayed by decode and display unit 48 to allow the operator to identify that he has correctly entered the desired data.

A priority logic circuit 50 provides proper timing for passing the data in register 46 through the gate bank 56 to the transmit data shift register 58. In the absence of a GO input from the manual key input 42, the data entered into the transmit data shift register 58 is the channel numbers which are presently being used by the ground station.

The leading edge of each transmit enable gate pulse resets flip-flop 33 and passes through AND gate 31 to set flip-flop 35 and also set flip-flop 33. When flip-flop 35 is set, it energizes AND gates 37 and 39. If the GO button in the manual key input 42 is depressed, there will be an output from AND gate 37 which energizes AND gate 43 and passes through OR gate 47 to trigger the single shot generator 49. When triggered, the single shot generator provides a pair of output voltages corresponding to the logical outputs XFER STROBE and $\overline{\text{XFER STROBE}}$. The duration of the single shot pulse is less than that of the transmit enable gate pulse. When single shot 49 is triggered, there will be an output from AND gate 43 which is referred to as the GO WORD XFER, which controls gate bank 56. It the GO button of the manual key input 42 is not depressed, then gates 37 and 43 will not produce outputs therefrom. Instead, there will be an output from the invert gate 41 resulting in an output from AND gate 39. The output of AND gate 39 energizes AND gate 45 and passes through OR gate 47 to trigger the single shot 49. When the single shot 49 is triggered, an output pulse appears at the output of AND gate 45. The latter output pulse is referred to as the BUSY WORD XFER and controls the counter 62 and gate bank 60. After a fixed time duration following the triggering of single shot 49, the output voltages therefrom return to their original values. The positive going edge of the lower output voltage resets flip-flop 35.

The information in the transmit data register 58 is the information sent out by the station via the common routing channel carrier during the assigned station burst time. Assuming that each station transmits a burst once every 300 milliseconds, and thus the TDM frame time is 300 milliseconds, the transmit data shift register 58 receives a transmit enable pulse from the common routing channel unit once every 300 milliseconds. The transmit enable pulse is long enough to allow the entire contents of transmit data shift register 58 to be shifted out of the register and sent to the common routing channel unit. The register 58 also receives transmit shift pulses from the common routing channel unit. The transmit enable pulse occurs slightly in advance of the first transmit shift pulse, and the former is used to control the priority logic circuit 50, which determines whether busy channel information or another type of information will be loaded into the transmit data register 58.

Figure 6:
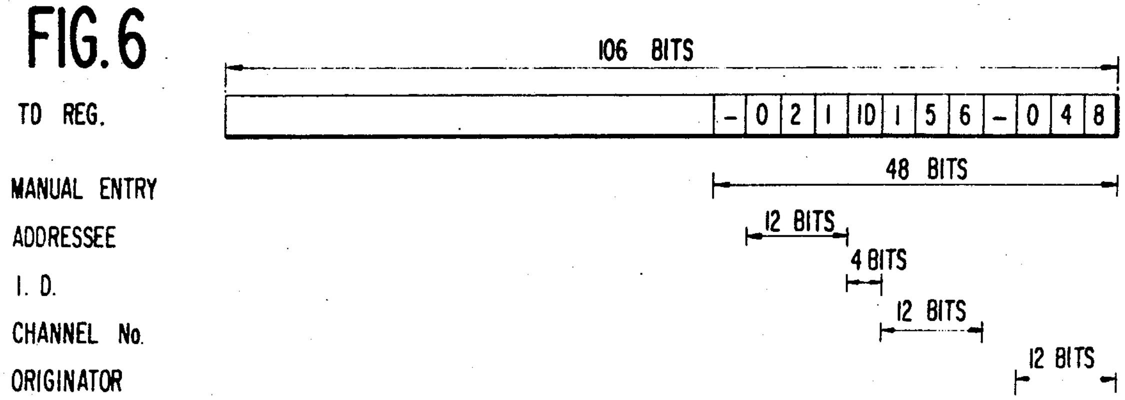
FIG. 6 illustrates the arrangement of data loaded in a register within the demand assigned switching and signaling subsystem.

Although, in the manual mode described herein the largest block of data which is entered into the transmit data shift register 58 is the 48 bits of data which is loaded in the input register 46, it will be assumed that the transmit data shift register is 106 bits in length and the format of the data transferred from DASSS to the CRC unit is that illustrated in FIG. 6. It will be noted, that in the manual mode, the majority of the bit positions within the transmit data shift register remain unused. However, those bit positions may be used for transmitting other information, such as multiple requests or multiple channel busy information.

The priority logic circuit 50 operates in response to each transmit enable input from the CRC to provide a busy word transfer output on lead 53, except when the GO key of the manual key input 42 is depressed. When the GO key is depressed, a transmit enable input causes a GO work transfer output on line 54. The busy word transfer output on line 53 energizes gate bank 60 to pass busy channel information into the transmit data shift register 58 whereas the GO word transfer output on line 54 energizes the gate bank 56 to enter keyed in information into the transmit data shift register 58.

The busy word transfer output on lead 53 advances a binary counter 62 which recycles every 10 inputs (assuming there are 10 channel units in the station). If a channel unit is not in use when the counter 62 cycles to the equivalent number then the counter is immediately advanced to the next count by sensing the lack of an output in OR gate 68 via lead 67 and passing a 1 MHz locally generated clock pulse to the counter 62 via AND gate 63 and OR gate 61. This procedure insures that only the busy channels are transmitted. The output from the binary counter 62 is decoded by a binary decode matrix 64 and each one of the decoder outputs gates out a channel frequency number stored in one of the channel unit holding registers **66*a*—66 to be passed through an OR gate 68 and through gate bank 60 to the transmit data shift register 58**. The channel unit holding registers may be any means, for example a manual means, in which a code number corresponding to a channel frequency is entered manually via a coded plug in unit. A specific example of a channel holding register will be described hereafter.

For the present, it is sufficient to understand that if channel unit number 1 is operating on a selected channel carrier number 17, the following conditions prevail: the channel unit holding register **66*a*, which corresponds to the first channel unit, has a coded key plugged into it. The coded key is the one for channel carrier number 17 and results in a BCD output from the channel unit holding register 66*a* which represents the digits 017. Each time the counter 62 reaches a count of 1, and channel unit one is in operation, the decoder provides an output which energizes out-gates associated with holding register 66*a* to pass the number 017 through the out-gates, and then through gates 68 and 60 on into the proper digit positions of transmit data shift register 58. In this case, the proper digit positions are those corresponding to the channel number as indicated in FIG. 6. It will also be noted that since only the channel number, which is busy, is inserted into the transmit data shift register 58** at this time, the statement digit position will remain at 0, which in the code shown in FIG. 5*b*, indicates that it is a channel status statement. Each time counter 62 advances one step, a different busy channel number is entered into the transmit data register 58. In this manner, the DASSS is continuously transmitting, during the station burst time, information about the channels which are presently being used by the station. Each channel unit holding register has a second coded output, which need not necessarily be a BCD code of the channel number. The second coded output is applied to the frequency synthesizer gates, to be explained more fully hereafter, to cause the corresponding channel carrier frequency to be sent to the modulator in the channel unit. Thus, if the coded plug in key representing channel number 17 is plugged into channel holding register 66*a*, representing the first channel unit, a code representing channel number 17 is applied to a group of gates in the frequency synthesizer which service only the first channel unit. The gates are energized by the code to send the carrier frequency corresponding to channel number 17 to the PSK modulator of the first channel unit.

Since all stations operating in this system receive all of the signals passing through the satellite, each station will receive its own TDM bursts. Thus, when the request data passes through the satellite it will be received again by the originator station. With 50 stations operating in the system, each station receives 50 TDM bursts of routing information during each 300 millisecond TDM frame time. That is, a burst is received once every 6 milliseconds. The bursts are demodulated in the CRC and transmitted to DASSS via a receive data input line. Also transmitted to DASSS are received shift pulses and an enabling pulse which enables the received data to be shifted into a receive data shift register 70, (FIG. 3*c*). The format of the data shifted into the receive data shift register 70 is that illustrated in FIG. 6. However, the receive data shift register 70 is 127 bits in length as opposed to the transmit data shift register 58 which is 106 bits in length. The purpose of the additional length of the receive data shift register, in the specific example described herein, is to accommodate an additional 21 bits which make up an error polynomial. The error polynomial and its function will be more fully understood following a description of a specific example of a common routing channel. For the present, it is sufficient to note that at the end of the receive enable pulse, the receive data shift register 70 will be loaded and will contain the BCD codes of the addressee station, the ID statement, the selected channel number, and the originator station code, in the respective bit positions of the register. It should also be noted that DASSS receives one further pulse from the CRC. This pulse is an error pulse which energizes input lead 72 when the CRC error detector detects an error in the received routing data. If an error detector pulse occurs on lead 72, it will occur somewhere between the shifting in of the 107th data bit and the 127th data bit.

The error pulse input completely resets the receive data shift register 70 to all zeros, and also resets a binary counter 74. The counter is enabled by the receive enable pulse and counts the receive shift pulses which occur at the data bit rate of 50 kilobits per second. Thus, when the counter reaches a count of 127, the receive data shift register 70 should be fully loaded. The counter cooperates with the decoder 76 which decodes selected count conditions within the binary counter 74. When the counter reaches the count of 127 the decode matrix provides a pulse output which is then used, as will be described, to energize a group of decoders which decode the routing information loaded into the receive data shift register. It will be apparent to one of ordinary skill in the art that if a receive data shift register is used which is shorter in length than the information burst, then the decoders could be energized sequentially by different outputs from the decoder 76, rather than being energized simultaneously as in the specific example described.

The BCD digits within the fully loaded register 70 representing the addressee, ID statement, channel number, and originator, are sent to four decoders respectively. The digits representing the addressee code are sent to an addressee decoder 78 which provides an output only if the station is the addressee. The statement decoder 80 receives the digit corresponding to the ID statement and decodes the same, providing an output on one of four lines representing respectively a request, a confirm, a busy, or a release statement.

The digits representing the originator code are applied to the originator decoder 82. The latter decoder provides an output when the instant station is the originator. Thus, an output is provided by decoder 82 whenever the station receives its own request. The digits representing the channel number are applied via gate banks 84 and 86 to a channel number decoder matrix 88 which decodes the code number and provides an output on one of 240 output lines indicating the channel number received. Flip-flop 90 energizes gate bank 84 at count time 127, and energizes gate bank 92 at all other times.

Assuming that the station has received its own TDM burst request, there will be an output from the originator decoder 82, an output on request line of the statement decoder 80 and an output on line 37 of the channel number decoder 88. An active channel register memory 94 within the DASSS contains up-to-date "busy" or "idle" information about every channel within the entire system. Thus, for example, the register may have 240 stages, each stage representing a different channel number, with a binary one in stage *n* indicating that the channel number *n* is in use and a binary zero indicating that the channel is available. The register memory 94 is kept up-to-date as follows: Each time the receive data register 70 receives a busy statement, the statement decoder 80 provides an output on the busy line and the channel number decoder matrix provides an output on align corresponding to the busy channel. The output from the channel number decoder 88 energizes the selected in-gate 96 allowing the busy output of the statement decoder to set the corresponding stage of the register memory 94 to a binary one. Since each DASSS is constantly receiving the busy information from all of the other units as well as receiving the busy information it initiated, the channel memory 94 is maintained up-to-date.

Whenever a channel number is selected by the operator or by any other means, there is a possibility that at the time the selection was made the channel number was in fact available but that a remote station is attempting to seize the same channel within one TDM frame time. Thus, the possibility exists that following the selection of a channel number by the operator, the channel becomes busy as a result of the prior seizure. If the latter occurs, the statement decoder output in combination with the channel decoder output will have busied the proper stage of channel memory 94 prior to the time that the request is returned to the ground station. As an example, assume that station A is the one shown in the drawing and that at station C channel number 052 is requested. Also, assume that subsequent to the request of the channel number at station C, a similar request is made at station A. The transmitted burst from station A containing the request for channel 052 is received by the satellite and relayed to all of the ground stations including the originator ground station. Prior to that time, however, station C has transmitted a request for channel 052 which is received by station A prior to the time it receives its own request. Thus, when the data containing the request from station C is loaded in the receive data shift register 70, the statement decoder 80 energizes the request line and the channel number decoder matrix energizes output line 052 thereby setting to a busy condition the fifty second stage of the channel memory 94. Following this, the burst including the request from station A is received at station A and loaded in the receive data shift register 70. When the latter occurs the statement decoder 80 energizes the request line once again and the channel number decoder matrix energizes line 052 once again. In response to energized line 052 the out gate 98 passes the condition of memory stage 052 to AND gate 100. Since memory stage 052 was previously set to the busy condition (binary 1), AND gate 100 will provide a GLARE output which indicates that the requested channel is busy or at least it was previously requested (the latter is also considered to be a busy condition). Separate phases of a 50 kilobit/sec. clock may be used to insure that during a test for glare, the out gates 98 are energized prior to the in gates 96.

The GLARE output is then ANDed with the output from the originator decoder 82 to light up a GLARE light. When the GLARE light gate goes on it indicates to the operator that he has to request a different channel number. The same output which energizes the GLARE light also inhibits the inhibit gates 102 and enables the display 106. When the gates 102 are inhibited, the data corresponding to the request statement is locked into the display register 104 and displayed on the display unit 106. Thus, the operator sees that he made a request for a certain channel and the GLARE light indicates to him that he cannot have that channel because it is busy. When this occurs, the operator has to make a new request.

Under most conditions, when the station's own request is received, the requested channel will not be busy and therefore no GLARE will be indicated. Also, it will be noted that the received request will operate to busy the corresponding channel stage of the channel memory 94. Since the request message is received and decoded at the originating station within about 300 milliseconds following the initiation of the request, the operator will know instantly following the keying in of the request message whether or not the channel requested is available for seizure. Assuming the GLARE light does not go on almost instantaneously after the operator keys in the request message, he then begins seizure of the requested channel by manually inserting a coded plug-in unit corresponding to the selected channel number (017) into a selected available channel unit holding register. Thus, if the coded key corresponding to channel number 017 is inserted into the channel unit holding register **66*a*, a code output therefrom will energize a group of frequency synthesizer gates which will send the carrier frequency corresponding to channel number 017** to the PSK modulator within the first channel unit.

On the other end of the circuit, the recipient station B receives the request from station A which is addressed to station B. Provided that station B has a channel unit available, it transmits, during its burst time a confirm statement which names station A as the addressee, station B as the originator, and the paired channel of the originally requested channel number as the channel number code. The confirm message has the same format as that indicated in FIG. 6. When the burst containing the confirm format is loaded into the receive data shift register 70 at station A, the addressee detector 78 will provide an output which indicates that station A is the addressee of the data. The output from decoder 78 and ANDed with a $\overline{\text{GLARE}}$ condition to inhibit the gates 102 and enable the display unit 106. Thus, the message including the confirm statement will be locked into display register 104 and displayed on the display unit 106. The operator thus sees that he is the addressee, the station he called is the originator, and that he is receiving a confirm statement.

At this time, the operator could also send a "connect" statement to the CT to inform the CT that a circuit connection now exists between stations A and B through the selected channel unit, although the transmission of this information is not necessary, and is not a part of the present invention. Apparatus for transmitting this information to the CT is illustrated by the manual key input 108, and the associated units shown in FIG. **3*a***.

RECEIPT OF REQUEST AT STATION B

In the above description, it was assumed that station A initiated a call and the apparatus illustrated in FIGS. **3*a* through 3*c* represented the DASSS unit at station A. In order to describe the process which takes place in the DASSS unit at the recipient station, it will now be assumed that the apparatus shown in FIGS. 3*a*—3*c* represents the DASSS unit at station B, and furthermore, station A has transmitted in its TDM burst a request for channel number 3 and has named station B as the addressee. When the TDM burst containing the latter information is loaded in the receive data register 70, the addressee decoder 78 provides an output which indicates that station B is the addressee station. A test for GLARE is made in the manner previously described, and assuming that channel number 3 is not busy, a $\overline{\text{GLARE}}$ condition will AND with the output from the addressee decoder to lock up the display register 104 and the display unit 106. Thus, the operator will see on the display that originator station A wants to communicate with station B via channel number 3**.

Assuming, as described above, that the channel numbers are paired, and that channel 3 is paired with channel 15, the following procedure is accomplished at the station B DASSS unit. The operator informs the CT of the new request by manually keying in on the manual key input 108 (FIG. **3*a*) a call initiate identification statement, a number representing the channel unit or access line selected, and a country code number representing the originating country, Country A. A response from the CT will be received at the CT data register 36 (FIG. 3*a***) and will take the form of a complete ID statement which names the access line selected and the country code of station A. It should be noted that if the access line is not available or if the subscriber line is busy, the response from the CT will take the form of a busy ID statement and the operator at the DASSS unit will key in a busy statement which will be transmitted via the station burst. Receipt of a complete statement may also be used to start monitoring the time for which the subscriber is to be billed.

Following receipt of the complete statement, a confirm statement is then transmitted via the station B TDM burst to notify station A that station B has received the request and has a channel unit available. Also, an available channel unit is selected and the frequency synthesizer is energized to send the carrier corresponding to channel number 15 to the PSK modulator of the selected channel unit. One method for selecting the channel unit is as follows: the operator selects a coded plug in key corresponding to channel number 15 and inserts the plug in key into the channel unit holding register, 66, which is selected. Assuming that the channel unit holding register for the second channel unit is selected, a code is sent out from the channel unit, **66*b*, which controls the frequency synthesizer gates corresponding to the second channel unit, to cause those gates to transmit frequency number 15 to the PSK modulator of the second channel unit. Also, as will be described more fully in connection with a specific embodiment of the frequency synthesizer and the holding units, the aforementioned code causes the proper mixer frequency to be applied to the receive channel unit for receiving the channel number 3** frequency which is transmitted by station A.

A confirm statement is transmitted via the TDM burst of station B by manually keying in on the key input device 42 the digital combinations which name station A as the addressee station, a confirm statement as the ID statement, channel 15 as the channel number, and station B as the originator of the confirm message. When the GO button is depressed, the latter information is loaded into the 48 bit positions (indicated in FIG. 6) of the transmit data shift register 58, after which it is shifted out and transmitted via the station B TDM burst.

After the circuit is formed, it is broken in the following manner. Assuming the subscriber at B hangs up first, the CT notified DASSS of this by sending a disconnect statement to the data register 36 in which at least a disconnect statement and the channel unit are identified. The operator at DASSS then checks to see if he is the originator. If he is the originator then he manually inserts a release statement via the manual key input device 42 which names station A as the addressee station, station B as the originator station and channel 15 as the channel number. The latter information is transmitted via the TDM burst of station B in the manner heretofore described. The operator also removes the coded plug in from the channel unit holding register. Since all stations receive the release statement sent out by station B the statement clears the corresponding channel number stage in the channel register memory 94 of all stations. At station A, the release statement will be displayed on the display unit 106 because station A is the addressee station. Station A may then also send out a release statement in which channel number 3 is named. However, this may not be necessary when paired channels are used if each stage in the channel register memory 94 is used to represent the busy or idle condition of a pair of channels.

As previously stated, when an operator makes a request he selects a channel number which is indicated on the available channel decode and display 44. The latter display cooperates with the channel register memory 94 to display an available channel number in the following manner. A pseudo-random sequence generator 110 of the type known in the art as an M-sequence generator provides a pseudo-random count sequence. The contents of the generator at any time represents a particular channel. The purpose of using a pseudo-random sequence rather than a standard 1, 2, 3, etc. sequence is to prevent the orderly selection of channels by all ground stations at the same time. The number within the M sequence generator 110, representing a particular channel number, is gated into the channel number decoder unit 44 for display. The channel number output from the M sequence generator 110 is decoded by the channel number decoder 88 causing the out gates to pass the busy or not busy condition of the channel. If the channel is busy a clock pulse advances the M sequence generator and a new channel number is tested. This operation will continue until a not busy channel number is found. When the latter occurs the channel number will be held in the M-sequence generator and displayed on decode and display unit 44.

CRC

Figure 8:
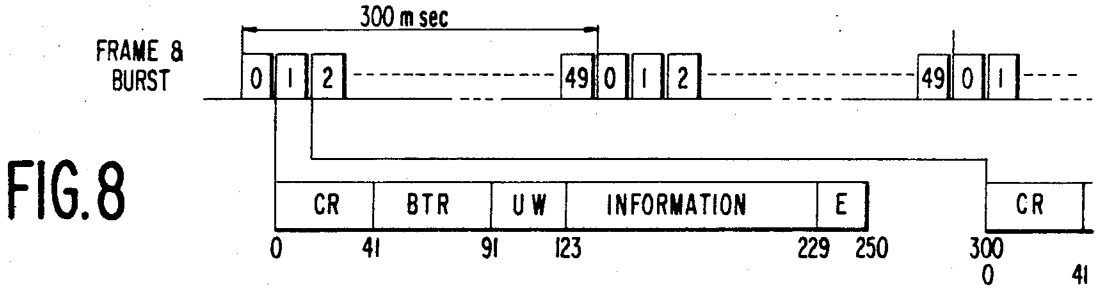
FIG. 8 illustrates the time of transmission of the burst signals from the community of stations via the common routing channel, and also illustrates the format of a single burst signal.
Figure 7A:
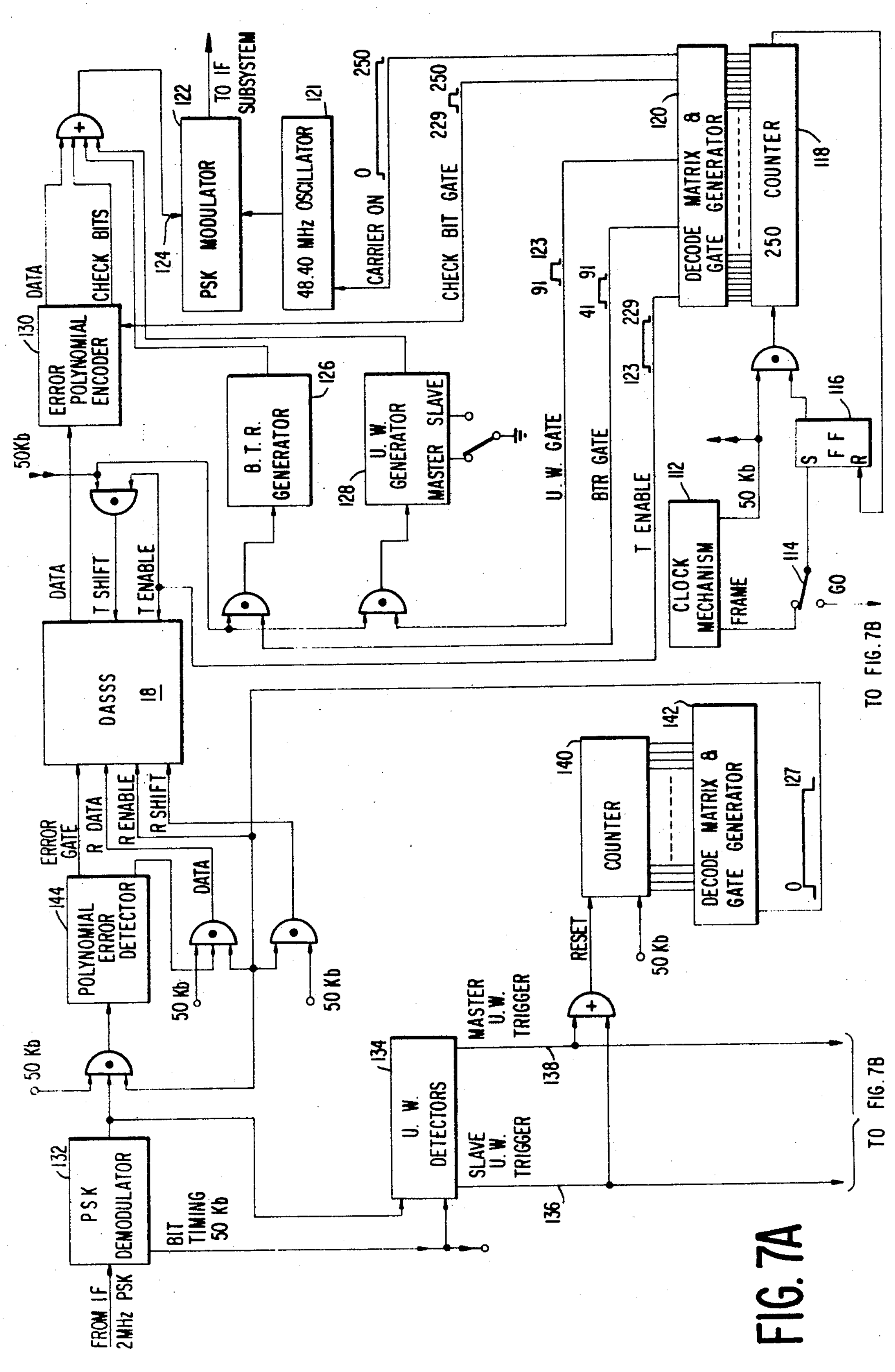
FIGS. 7*a* and 7*b* are block diagrams illustrating an example of the common routing channel useful in the present invention.
Figure 7B:
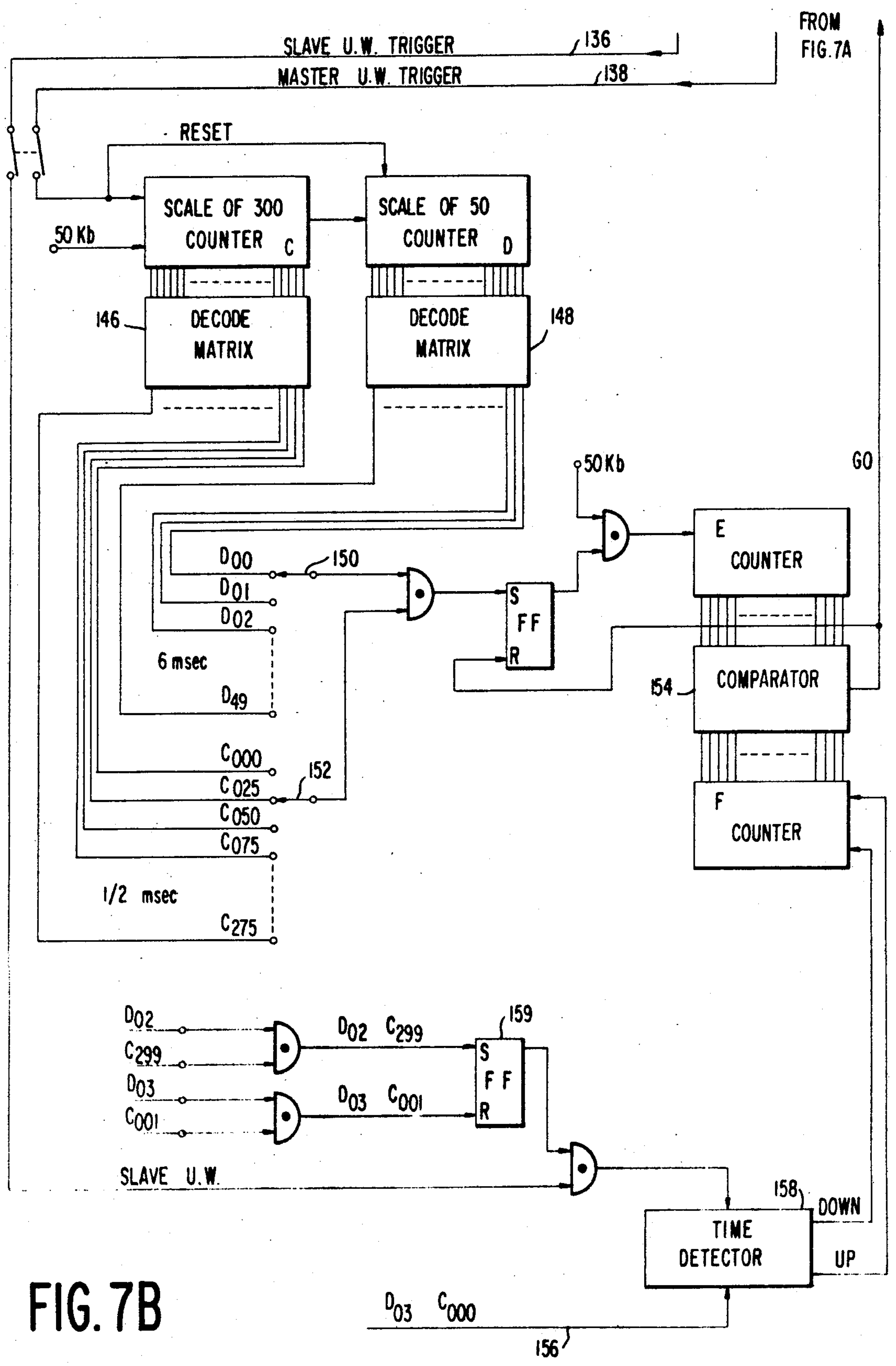

The function of the common routing channel (CRC) shown in FIGS. 7*A* and 7*B* is to control the burst time at each station and maintain synchronization for the bursts of all stations. In an assumed example, there are 50 stations each of which provides a burst of communications on the time division multiplexed (TDM)channel carrier, which is 48.40 MHz, at a time such that the 50 bursts coming from the respective 50 stations occur at the proper times in the satellite and are received by each station at the proper times. The burst times from the 50 stations are indicated in FIG. 8 wherein the number inside of each burst represents the particular station transmitting the burst. For example, a zero burst is transmitted by Station No. 0, etc. The initial designation of the order in which each station transmits its burst is an arbitrary decision; however, once the designations are assigned each station transmits its burst in time at the proper instant. One method which may be used for initially placing the station burst in the proper time slot is described and claimed in commonly assigned copending application Ser. No. 594,830, "Acquisition Technique for Time Division Multiple Access Satellite Communication System," filed Nov. 16, 1966. Therefore, initial synchronization will not be described herein. Even though the TDM channel may be properly synchronized at any one time, the satellite is moving and therefore it is necessary to provide a means which maintains synchronization. The latter means is provided by the CRC apparatus. The zero station sends out a reference which is used by all other stations to maintain proper synchronization.

The CRC apparatus illustrated in the drawing could be at the zero station (referred to hereinafter as the master station) or at any of the other stations, referred to hereinafter as the slave stations. A changeover in operation from master operation to slave operation merely requires the movement of a switch. The CRC is divided into three parts, the transmit portion the receive portion, and the synchronization maintenance portion.

In the transmit portion there is a clock mechanism 112 (FIG. 7*a*) which provides output clock pulses at the rate of 50 kilobits per second and frame pulses which occur once every 300 milliseconds. Whether or not the transmit operation is initiated by a frame pulse or by a GO pulse depends upon whether it is being used by a master station or a slave station. The initial discussion will assume that the station is being used as the master station, and thus the frame pulse output from the clock mechanism 112 is connected via switch 114 to the set input of the flip-flop 116. It should also be noted that in actual practice the clock mechanism may provide a plurality of 50 kb/sec outputs which are phase shifted from one another. The purpose of the phase shifted clock outputs is to allow phase delays in the operation of certain elements in the system such as the sequential loading and decoding of a register during a single bit period. However, a complete understanding of the present invention may be had by assuming that a single 50 kb/sec clock output is generated by the clock mechanism.

When the frame pulse occurs, thereby starting the 300 millisecond frame, the counter 118 receives the next 250 clock pulses following which time it resets the flip-flop. A 250 unit counter is chosen because in the specific example described herein each burst transmitted is 250 bits in length. The conditions of the stages in the 250 unit counter 118 are applied to a decode matrix and gate generator 120 in which the binary status of the stages of counter 118 are decoded, and selected ones of the decoded counts are applied to set and reset inputs of flip-flops to generate gating pulses of desired duration. The desired gates at the output of the decode matrix and gate generator 120 and their respective functions are as follows: The CARRIER ON gate lasts for the duration of the 250 input clock bits and turns on a carrier in oscillator 121 to provide a burst from the station. When the carrier is first turned on the output of the PSK modulator 122 will be an unmodulated carrier wave because of the absence of an input at the modulating input terminal 124. The portion of the burst which is an unmodulated carrier wave is used, as is well known in the art, to allow the PSK demodulators on the receive side of all CRC units lock onto a carrier frequency. At bit time 41, BTR GATE comes on and lasts until bit time 91. The latter gate pulse passes the 50 kb/sec. clock pulses to the BTR generator 126 for its duration. The BTR generator merely generates a series of alternate binary 1's and 0's to modulate the carrier. The time in which the carrier is modulated by the BTR generator output is the bit recovery time and, as is well known in the art, this time is used by the PSK demodulators for locking onto the bit timing of the received data.

At bit time 91, the unique word gate comes on and lasts until bit time 123 thereby allowing the clock pulses to be applied to the unique word generator 128. There may be two unique word generators in block 128, one of which is used when the CRC unit is operating as the master and the other of which is used when the CRC unit is operating as a slave. As an example, a unique word generator may be a 32 stage shift register which is enabled by the unique word gate and shifted by the clock pulses applied thereto, resulting in a 32 bit data word at the output which modulates the carrier frequency in PSK modulator 122. The master unique word will be different from the slave unique word but all stations operating as slave stations will transmit the identical slave unique word. Following the transmission of the unique word, the TRANSMIT ENABLE gate pulse comes on and lasts until bit time 229. The latter gate is applied to the transmit data shift register 58 in DASSS and also gates 106 clock bits, referred to as the transmit shift bits, to the transmit data shift register 58 (shown in FIG. 3*b*) to cause the latter register to transmit its 106 bits of data through the error polynomial encoder 130 to PSK modulator 122. Error detecting means vary widely in the digital data art and one type, which is shown herein by way of example, is the polynomial error detection means. As is well known in the art, the error polynomial detection system operates as follows: The encoder receives a field of data of given bit length and generates in response thereto a group of error check bits, referred to as the error polynomial, which are uniquely related to the input data. The check bits are tacked onto the data bits and transmitted along with the data to wherever the data is sent. At the receiving end, the stream of data plus check bits is applied to an error detector which regenerates the error polynomial in response to the data, compares the regenerated error polynomial with the received error polynomial, and provides an error indication if the two do not compare favorably. The generated error check bits for error detecting code may be of the type known as BCH codes, the latter being described in "Error-Correcting Codes" by W. W. Peterson, published by MIT Press and Wiley and Sons, Inc. copyright 1961. In the present case it is assumed that the error code or error polynomial generated by encoder 130 is 21 bits in length. Thus, the total format of a single burst, generated by the latter described apparatus, and shown in FIG. 8, includes in the following order, carrier recovery time, bit recovery time, a unique word, routing data from DASSS, and an error polynomial. Since the frame pulse from clock mechanism 112 occurs once every 300 milliseconds, the station transmits a burst once each frame.

At the receive end of the common routing channel the PSK demodulator 132 receives all bursts that pass through the satellite and thus, it receives a total of 50 bursts including the one it transmitted. The PSK demodulator 132 operates in a manner known to the art to lock onto the incoming carrier, provide a source of output clock bits at the proper reference rate (50 kb/sec) and provide the demodulated data output. The data is shifted into a pair of unique word detectors 134 by the 50 kb/sec clock pulses. Although a single unique word detector is shown, it is apparent that two are provided, one to provide a slave trigger output on lead line 136 when a unique word from any slave station is detected, and the other to provide a master output trigger on lead line 138 when a unique word from the master station is received. The unique word detectors may be decoders of a type well known in the art to decode the specific 32 bit code words transmitted by the master and slave stations. It will be noted that the trigger outputs occur on receipt of the 32*nd* bit of either unique word. The slave or master trigger resets a binary counter 140 which counts the clock bits and cooperates with a decode matrix and gate generator 142, which is similar to generator 120 on the transmit side of the CRC, to provide a RECEIVE ENABLE gate pulse lasting from bit time 0 to bit time 127.

The RECEIVE ENABLE pulse will be in time coincidence with the information plus error polynomial portion of the received burst due to the fact that the information portion directly follows the last bit of the unique word. Thus, the information plus error polynomial is gated and clocked through the polynomial error detector 144 which operates in the manner described above. The RECEIVE DATA along with the RECEIVE ENABLE pulse and the RECEIVE SHIFT pulses are sent to DASSS where they are applied to the RECEIVE DATA shift register 70 (shown in FIG. 3*c*). If an error is detected in the error detector 144, an ERROR GATE pulse is applied to the DASSS unit. It should be noted that the counter 140 is reset and the RECEIVE ENABLE gate regenerated in response to each master and slave unique word received at the station. This is because DASSS must receive the information from all bursts, including its own.

The remaining portion of the CRC apparatus operates to properly time the burst of a slave station with respect to the burst from the master station. The basis by which the apparatus maintains synchronization is as follows. Each slave station knows that it should receive its own burst a specific time after it receives the burst from Station No. 0. The slave station notes when the master burst is received, when its own burst is received, and if its own burst is off from the time at which it should have been received, then the initiation of a transmit burst from that station is corrected by the amount which the received burst is off the proper time. The apparatus which carries out this operation is illustrated in FIG 7*B*and is operative only when the CRC is operating in one of the slave stations.

When the master unique word is detected, it resets a scale of 300 counter referred to as the C counter and also resets a scale of 50 counter referred to as the D counter. The C counter recycles for every 300 input clock bits and provides a single input to the D counter at each recycle time. As can be seen from FIG. 8 every 300 counts of the C counter corresponds to 1/50 of the frame time, and since there are 50 bursts within each frame the pair of counters provides a timing reference against which all other received information can be compared. Specifically, in this case it provides a timing reference against which the reception of the slave station unique word can be compared. The condition of the D counter is decoded by a decode matrix 148 which provides 50 output lines $D_{00}$ through $D_{49}$, each representing a 6 millisecond interval. The counter and decode matrix operate in a manner well known to the art to energize $D_{00}$ when the D counter registers a count of zero, $D_{01}$ when the D counter registers a count of one, $D_{02}$ when the counter registers a count of two, etc. Thus, each output from the decode matrix represents the time at which the slave word from the corresponding station should be received. For example, assuming that the CRC shown in the drawing is slave station No. 3, the slave unique word which was transmitted by the transmit side of the CRC should, if properly synchronized, arrive at the receive side of the CRC at the same time the D counter receives its third input and output $D_{03}$ becomes energized.

The C counter combines with decode matrix 146 to operate in a similar manner to provide the outputs which correspond to the count conditions instantaneously within the C counter, Thus, $C_{25}$ occurs when the C counter registers a count of 25, and $C_{275}$ occurs when the counter registers a count of 275. Increments of 25 counts on the C counter are indicated as being provided. However, it will be apparent that a separate output wire from the decode matrix 146 could be provided corresponding to all 300 counts respectively of the C counter.

As described in the above mentioned copending patent application, initial synchronization in a TDM channel can be achieved by manually adjusting the burst initiation time and viewing the burst receipt time with respect to the master receipt time on a scope. In the present apparatus a manner in which the transmit time may be initially manually adjusted is by turning a dial which controls the switch arms 150 and 152 (FIG. 7*b*). As the switch arms move, the time at which the flip-flop 116 (FIG. 7*A*) is set is varied and thus the time at which the burst is transmitted is varied. The F counter is preset at some midrange, and when the E counter reaches a count equal to the contents of the F counter the comparator 154 provides a GO output which is the burst initiation output. Referring to the transmit side of the CRC shown in FIG. 7*A* it is seen that for slave stations, the GO signal rather than the frame pulse in the clock mechanism controls the start of the transmitted burst. In order to initially acquire synchronization, the switches may be manually moved to increase or decrease the burst starting time until the received station burst appears at the proper time on a scope as explained in the above mentioned copending patent application.

As stated above, once initial synchronization is obtained, it must be maintained due to the fact that the relative distances between stations and satellite does not remain static. However, during a single frame time the satellite will not move very far, relatively, and therefore even if a burst is not at the correct time it will be off the correct time by only a slight amount. Thus, the slave station knows approximately, within very fine limits, when its own burst will be received. Since all slave stations send the identical slave unique word, a mere energization of the slave trigger output 136 from the unique word detector 134 on the receive side of the common routing channel does not indicate whose burst is being received. However, since each station knows the approximate time of the receipt of its own burst it creates a window or aperture gate which selects the particular slave trigger output resulting from the station transmitted burst. Thus, the gated slave output from the unique word detector will be one transmitted by the station itself. Since the loss of synchronization from frame to frame is so small, the window or aperture gate can be two or three bits wide. One method by which the aperture gate can be generated is by selecting outputs from the decode matrices 146 and 148 which define the approximate time during which the unique word is expected. Assuming again that the apparatus shown in the drawing is at station No. 3, the slave unique word in the burst from Station No. 3 should occur at exactly 18 milliseconds following the detection of the master unique word. The exact expected time can be generated by ANDing the matrix outputs $D_{03}$, representing three burst times after the master burst, with $C_{000}$ representing a time of 0 (zero). The logic result of the latter AND function appears on line 156 and is applied as one input to a time detector 158. The aperture is provided by ANDing $D_{02}$ with $C_{299}$ to set flip-flop 159, and by ANDing $D_{03}$ with $C_{001}$ to reset flip-flop 159. Thus, flip-flop 159 is in a set state for 25 bit times prior to the expected time of receipt of the slave unique word from burst No. 3 and remains on for 25 bit times following the expected time of receipt of the slave unique word from Station No. 3. Thus, if a slave unique word is detected and passes into the time detector, it will be the slave unique word received from burst No. 3. The aperture gate is a convenient method for selecting the slave unique word from the wanted burst, but it will be apparent that other methods could also be used, such as providing a separate unique word for each slave, or detecting the address information within each burst as well as the slave unique word.

The lower and upper inputs respectively to the time detector represent, relatively, the time at which the burst from Station No. 3 should be received in order to be properly synchronized, and the time at which the burst from Station No. 3 was in fact received. If the actual receipt occurs prior to the time at which it is desired, the transmission of the burst from the station should be delayed slightly. This is accomplished by providing an input to the up terminal of the F counter which advances the F counter one count. Thus, it will take 1 clock bit longer for the E counter to reach the quantity contained in the F counter, and the GO pulse which initiates the burst for the station will be delayed by 1 clock-bit time. On the other hand, if the lower input of the time detector is received prior to the upper input time, indicating that the actual burst from Station No. 3 did not come soon enough, then the time detector provides an output which is applied to the down terminal of the F counter, to step that counter down by 1 count. Under those circumstances, the E counter will reach the quantity stored in the F counter 1 bit time sooner thereby causing the burst to be initiated 1 bit time sooner.

It should be noted that an engineering service circuit may be time multiplexed on the common routing channel thereby providing additional usage of the TDM channel. As is well known in the communications art, an engineering service circuit is used for operator coordination between stations.

Frequency Synthesizers and if Subsystems

Figure 12:
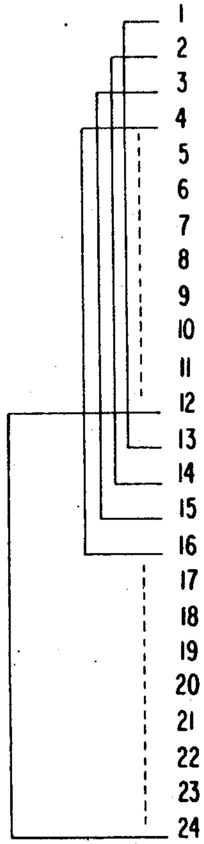
FIG. 12 is a table of channel numbers and their corresponding synthesizer codes and synthesizer frequencies.

A specific example of the frequency synthesizers, IF subsystems and their cooperation with the channel units will be based on the simplified assumption that there are three channel units, and 24 channels, of which channels 1 through 12 are paired respectively with channels 13 through 24. FIG. 12, shows, in tabular form, the channels. The paired relationship of the channels is indicated by the lines connecting selected ones of the channel numbers in column 1 of the table. Column 2 of the table represents a particular code, to be described more fully hereafter, which causes the frequency synthesizer gates to generate certain required frequencies. Column 3 represents the transmitter synthesizer frequencies generated in response to the corresponding synthesizer code. The latter frequencies, given in megahertz, are the carrier frequencies which are applied to the PSK modulators in the channel units. Column No. 4 includes the frequencies generated by the receiver synthesizer gates in response to the corresponding synthesizer code. Going horizontally across in columns 3 and 4, the frequency in column 3 is the transmit carrier and the frequency in column 4 is the mixer frequency necessary for receiving the corresponding transmit carrier. This can be seen by considering the table in view of FIG. 2.

As shown in FIG. 2, if station A decides to transmit on channel 3 the transmit synthesizer gates are energized to generate the transmit carrier frequency of 48.75 megahertz. Station B, knowing it will receive channel 3, energizes its receive synthesizing gates to generate the mixer frequency of 50.75 megahertz. The 2 megahertz lower side band out of the mixer is then applied via a narrow band pass filter to the PSK demodulator of the channel unit for extracting the information. Station B also knows that it must transmit on the paired channel, which is channel 15. The transmit synthesizer gates at station B are energized to generate the frequency of 49.95 megahertz, which is applied to the input of the PSK modulator. At station A, the receiver frequency for channel 15, which is 51.95 megahertz is generated so that the transmit frequency of channel 15 can be detected. In the specific example described herein, the PSK demodulators operate on a 2 megahertz carrier and thus for any given channel the receive mixer frequency generated by the receive synthesizer is 2 megahertz different from the transmit carrier frequency generated by the transmit synthesizer. It should also be noted that at any single station, even though the receive and transmit synthesizers are actuated simultaneously, the transmit synthesizer generates the transmit frequency corresponding to one channel and the receiver synthesizer generates the receive mixer frequency corresponding to a different, but paired, channel.

Figure 9:
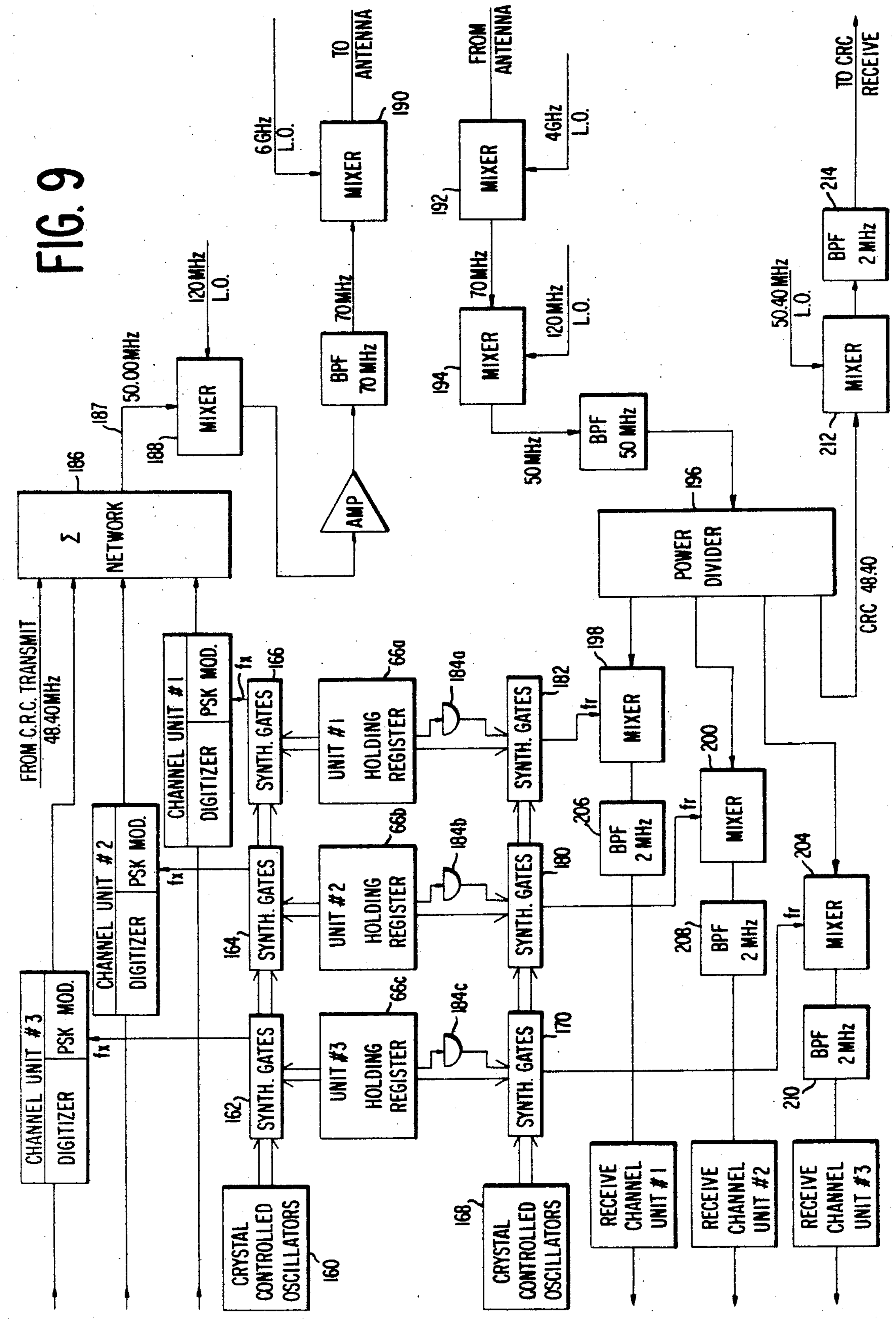
FIG. 9 is a block diagram illustrating the cooperation of the frequency synthesizers, the channel units, and the IF subsystem.

As shown broadly in FIG. 9, the transmit synthesizer comprises a group of 9 crystal controlled oscillators 160 which are applied to transmit synthesizer gates 162, 164, and 166. Each group of synthesizer gates services a single channel unit. Thus, synthesizer gates 162 provides an output frequency which is applied to the carrier input of the PSK modulator of channel unit No. 3. The same 9 frequencies are applied to each of the synthesizer gates and the output carrier frequency from each group is determined by the code word applied thereto by the channel unit holding registers 66. Referring back to FIG. 3B it will be remembered that there is a channel unit holding register 66 for each channel unit and that they provide a BCD output to the transmit data shift register 58, and a different code output to the frequency synthesizer gates.

The latter code, referred to hereinafter as the frequency synthesizer code is shown in column 2 of FIG. 12. For any code word shown in column 2, the horizontally adjacent frequency indicated at column 3 will be generated by the transmit synthesizer gates.

The receive synthesizer comprises nine crystal controlled oscillators 168 and the receive synthesizer gates 170, 180, and 182. The latter gates serve the channel units 3, 2 and 1 respectively by providing selected receive mixer frequencies to the mixers which are cooperating with the channel units. The receive synthesizer gates are identical to the transmit synthesizer gates, however, the frequencies from crystal controlled oscillator 168 are not identical with the frequencies from crystal controlled oscillators 160 thereby resulting in different frequencies produced for the same synthesizer code word. It will also be noted that in the transmission path between the channel unit holding register and a receive synthesizer gate there is an inversion function as indicated by the gates **184*a*** through *c*. The inversion function operates to invert the C and D leads in the code outputs from the channel unit holding registers. It can be seen from FIG. 12 that the codes for channels 1 through 12 can be converted respectively into codes for channels 13 through 24 by inverting the C and D outputs.

Figure 10:
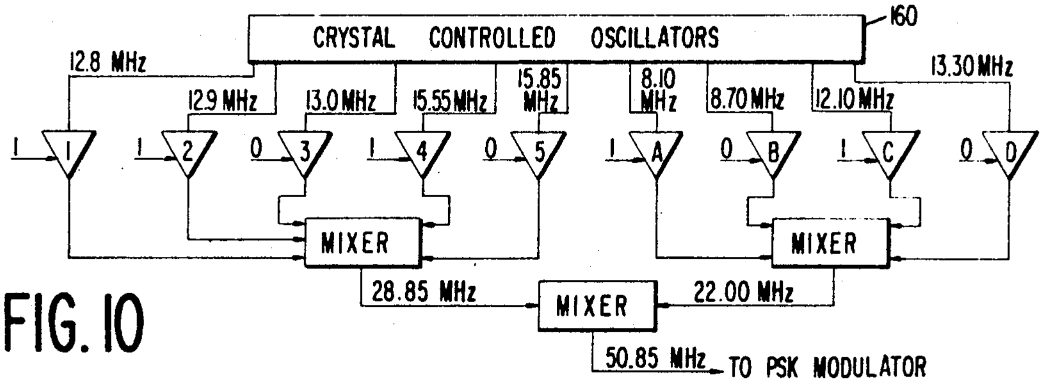
FIG. 10 is a block diagram illustrating an example of synthesizer gates which are indicated generally in FIG. 9.

A more specific example of the synthesizer gates and the holding registers will enable a better understanding of the latter operation. FIG. 10 shows the operation of a synthesizer gate responding to the nine frequency outputs from the crystal controlled oscillators 160. The synthesizer gate comprise nine analogue gates 1 through 5 and A through D, and three mixers. It will be noted that in the case of the synthesizer gates only the upper side bands are passed out of the mixer. The nine crystal controlled oscillators produce the frequencies illustrated, and they are applied to the analogue gates 1 through 5 and A through D as shown. The analogue gates may be of the type which pass the input frequency to the output when a low level or zero voltage is applied at a control input terminal and which block the frequency from appearing at the output when a high level or binary 1 voltage is applied to the control input terminal. The channel unit holding register provides the synthesizer code to the synthesizer gate via nine output lines. The nine lines are applied respectively to the analogue gates 1 through 5 and A through D, and for any code illustrated in FIG. 12, four of the output lines will have zero or low level voltage and the remaining five lines will have a high level voltage. In FIG. 10, the synthesizer gate is shown responding to the code word 35BD to produce the transmit carrier frequency for channel No. 24. The receive synthesizer gates are identical to the transmit synthesizer gates, however, the frequencies supplied by the crystal controlled oscillator 168 to the analogue gates A through D are 9.10 MHz, 9.70 MHz, 13.10 MHz and 14.30 MHz, instead of the ones indicated in GIG. 9. Under those circumstances, the same code, 35 BD will produce the receive mixer frequency, 52.85 MHz, which is the receive mixer frequency necessary to receive channel 24.

As mentioned earlier, for each holding register, the C and D output leads are inverted before application to the receive synthesizer gates. This provides correct pairing of the transmit and receive channels. For example, assume that channel No. 5 is selected for transmission and thus channel unit holding register 66A contains the synthesizer code 25AC. The code 25AC causes synthesizer gates 166 to generate the transmit carrier frequency 48.95 MHz. The pair channel for No. 5 is channel No. 17. By inverting the C and D output leads from holding register 66A, the code applied to receive synthesizer gates 182 will be 25AD, rather than 25AC, resulting in a generation of receive mixer frequency 50.15 MHz, which is the receive mixer frequency necessary to receive channel No. 17.

Figure 11:
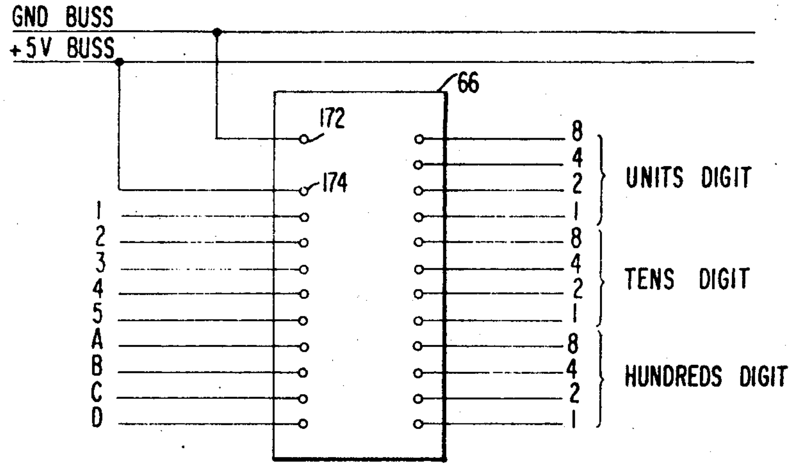
FIG. 11 shows an example of a plug-in receptacle useful as a channel holding register within the demand assigned signaling and switching subsystem.

A simple example of a manually operated holding register is illustrated in FIG. 11. The holding register 66 is merely a plug in receptacle having two sets of output terminals. The set of output terminals on the right of holding register 66 represent the BCD output terminals which apply the proper BCD code to the transmit data shift register 58 (FIG. 3B). The nine output terminals on the left hand side, designated 1 through 5 and A through D, respectively, apply the synthesizer code to the synthesizer gate. With the grounded input terminal 172 representing the binary zero level, and the +5 volt input terminal 174 representing the binary 1 input terminal, the proper BCD and synthesizer codes are generated by a plug-in unit which selectively connects the terminals 172 and 174 to the appropriate output terminals. In this example, as indicated earlier in the description of the DASSS unit, there will be a separate plug in unit for each channel. Thus, if channel 16 is selected the plug in number 16 is inserted into the holding register 66 resulting in a BCD output of 016 and a synthesizer code output of 15AD.

Referring back to FIG. 9, the information on the selected access lines are applied respectively to the inputs of channel units 1, 2 and 3. The channel units perform a number of functions, to be described more fully hereafter, which include those of digitizing the information and PSK modulating the selected transmit carrier frequencies with the digitized data. The output modulated carriers, along with the 48.40 MHz carrier from the common routing channel are multiplexed onto a single line by a resistive summing network 186. Since the entire transmit carrier spectrum is centered around 50 MHz, the frequency region of the signals at the output of summation network 186 is indicated as being in the 50 MHz region. The latter frequencies are then converted to the 70 MHz region by mixing them with a 120 MHz locally generated frequency in mixer 188 and taking the lower side band output therefrom amplifying it and applying it through a band pass filter centered at 70 MHz and wide enough to pass the entire spectrum of frequency converted carriers. The carriers (now in the 70 MHz region) are transmitted to the antenna station where they are applied to an up-converter, indicated as a mixer 190, which converts the carrier frequencies to the 6 GHz region for transmission to the satellite.

The satellite translates all frequencies received to the 4 GHz region and transmits them to all ground stations. At the receive side of the ground station the 4 GHz input signals from the antenna are down converted in mixer 192, transmitted to the IF subsystem location, and further down converted in mixer 194 resulting in the carrier spectrum again being centered around the 50 MHz region. The latter is passed by a band pass filter centered at 50 MHz and wide enough to pass the entire group of transmitter carriers.

Demultiplexing of the receive carriers is accomplished by a power divider 196, a plurality of mixers 198, 200, 204, and 212, and a plurality of narrow band pass filters 206, 208, 210 and 212 centered at 2 MHz. The power divider 196 power divides the incoming spectrum into a plurality of equal power output spectrums. Each output line from power divider 196 will contain the identical information that is on the power divider input line with the exception that it will be at a lower power. Frequency selection is made by the mixer and 2 MHz filter combination. As an example, in order to extract the information on the 48.40 MHz common routing channel frequency, a 50.40 MHz locally oscillated frequency is applied as one input to mixer 212. The latter frequency will mix with all of the frequencies in the receive spectrum but only the 2 MHz beat frequency resulting from mixing of the locally generated signal with the common routing channel frequency will contain the information transmitted via the common routing channel and will pass through the 2 MHz filter 214 to the common routing channel receive unit. In the same manner, the receive mixer frequencies generated by the receive synthesizer gates determine the channel selection, even though the modulated frequency ultimately applied to all of the receive channel units will be at 2 MHz. The receive channel units essentially reverse the operation of the transmit channel units thereby providing outputs on the associated access lines.

Transmit and Receive Channel Units

The channel units may have several modes of operation and there are a number of alternatives in apparatus selection. Several modes will be described first, followed by a more detailed description of apparatus suitable for performing one of the selected modes.

The first mode is continuous and uncoded 2-phase PSK. In this mode, after a satellite channel has been selected, the PSK carrier is continuously transmitted (i.e., not voice activated). Periodically, a binary output of the voice encoder has sync words added to it which are used by the received portion of the channel for frame synchronization. The binary input bit rate to the PSK modulator is 64 Kb/sec. (this mode will be described in more detail in connection with FIGS. 13*a* and 13*b*).

A second mode is the burst and uncoded 2-phase PSK. In this mode of operation, the PSK carrier output is voice activated, i.e., the carrier is turned "on" for transmission to the satellite only during talker activity. When the talker is silent, the carrier is turned "off" and satellite power is not utilized. Based on subscriber speech utilization statistics, 4 to 6 dB of satellite power is conserved in this manner. Note that in burst operation, the carrier frequency is not changed during talker silence and therefore "freeze-out" as happens in TASI systems does not occur. In the case of TASI, cable band width is the parameter which is of interest, whereas in the satellite application under consideration, satellite power and intermodulation products are the primary concern. In the TASI system, voice clipping occurs at the beginning of each burst due to the requirement of channel switching. No voice clipping occurs in the above signal unit because the voice coded binary signal is delayed 12 milliseconds in a magnetostrictive delay line, thus allowing the voice detector ample time to distinguish between the presence of voice or noise. The additional 12 millisecond delay in voice is negligible compared to the 170 millisecond satellite link delay. Tests in the laboratory have indicated that the quality of the channel is indistinguishable between the burst and continuous mode of operation.

The third mode of operation is the continuous and coded 2-phase PSK. In this mode of operation, the output carrier is "on" continuously but the binary voice coded information is encoded further into a biorthogonal code. The biorthogonal binary coded voice improves transmission performance by increasing satellite bandwidth used and requiring approximately 2 dB less satellite carrier power per channel than uncoded operation. Biorthogonal coding is useful in specific applications where a satellite is power rather than band width limited, or under a high intermodulation noise environment.

The fourth mode is the burst-coded 2-phase PSK. This is the same as the second and third modes combined. The use of biorthogonal coding requires additional synchronization information recovered at the receiver and care must be taken in selecting the sync word and circuitry to have a low probability of miss and false detection and a high probability of sync word detection.

Figures 13A, 13B:
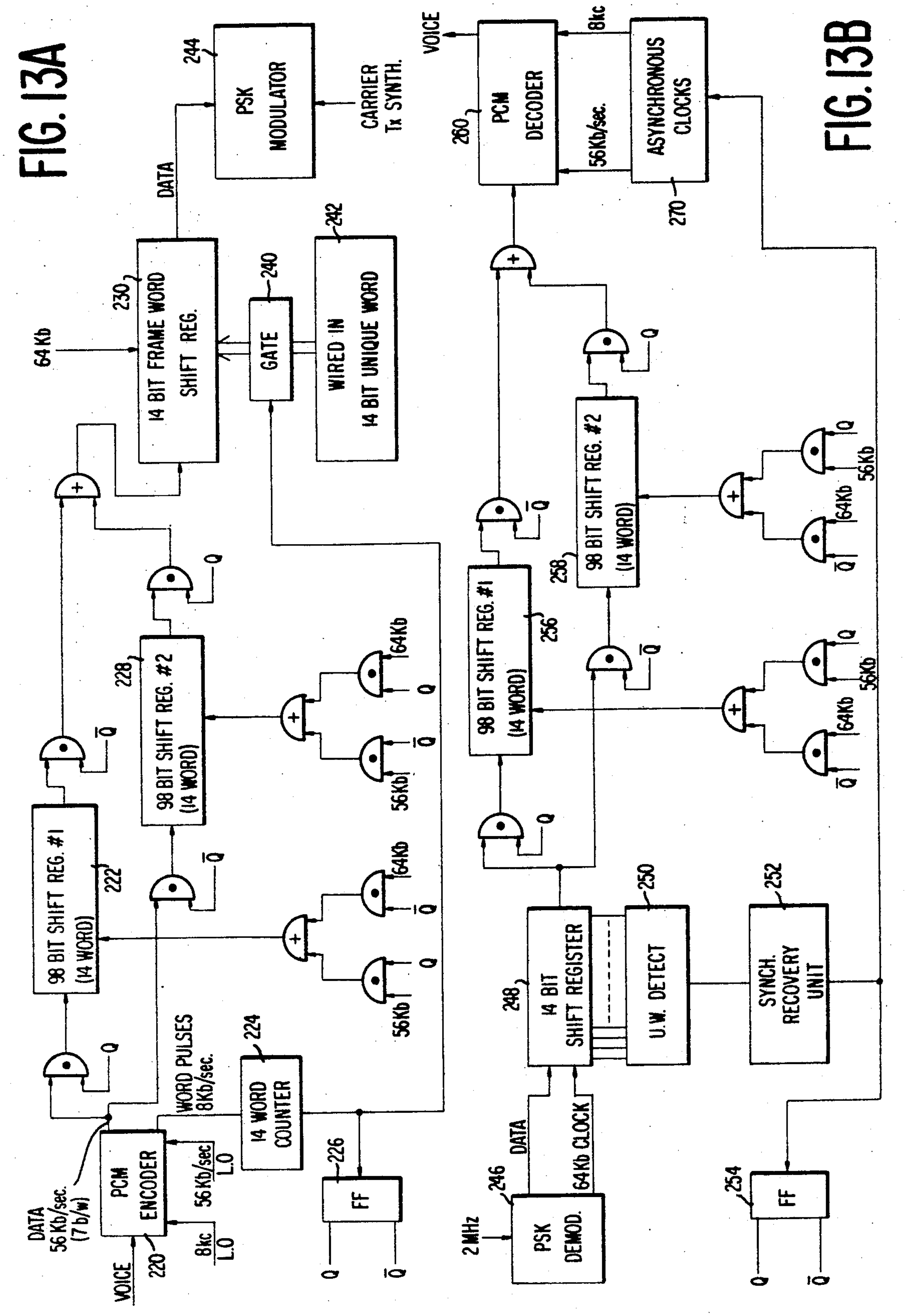
FIGS. 13*a* and 13*b* are block diagrams illustrating examples of a transmit channel unit and a receive channel unit, respectively.

FIG. 13*a* shows a single transmit channel unit operating in the continuous and uncoded 2-phase PSK mode, and FIG. 13*b* shows a receive channel unit operating in the same mode. On the transmit side, the voice or other data is applied to an encoder device 220 which may be a standard PCM encoder using hyperbolic companding, having an output bit rate of 56 Kb/sec. and a sampling rate of 8 kHz. One alternative would be to use an improved delta modulator operating at an output bit rate of 56 Kb/sec. In order to provide proper word and bit synchronization at the receive end, a frame sync unique word is transmitted along with the binary coded data periodically. In the present example, it is assumed that the frame word occurs every 14 data words. The word or sampling cycle pulses occuring at the frequency of 8 Kc/sec. are counted by the 14 word counter 224 which triggers a JK type flip-flop 226. Every 14 words of data out of the encoder 220 are alternately shifted into and out of the 98 bit shift registers 222 and 228. It will be noted that under the control of the flip-flop outputs Q and $\bar{Q}$ the shift registers are read in at 56 Kb/sec. and read out at 64 Kb/sec. The latter rate is used to allow the addition of 14 bits of frame sync unique word to be transmitted along with every 14 words of data. Each time counter 224 counts 14 word pulses, a unique code word, which may be permanently wired into the system as indicated at 242, representing the frame sync word, is gated via gate 240 into a 14 bit frame word shift register 230. The frame sync word and the 14 words in one of the shift registers 222 and 228 are passed to the PSK modulator at the rate of 64 Kb/sec. The latter data modulates the selected carrier frequency from the transmit synthesizer in PSK modulator 244.

On the receive side, a 2 MHz PSK modulated signal is applied to the PSK demodulator 246 which recovers the input carrier and the bit timing and demodulates the data. The data is clocked through a 14 bit shift register 248 at the rate of 64 Kb/sec. The data is then alternately shifted into and out of a pair of 98 bit shift registers 256 and 258. The data is shifted into the 98 bit shift registers at the rate of 64 Kb/sec. and shifted out at the rate of 56 Kb/sec. The data shifted out of the registers 256 and 258 are applied to a PCM decoder 260, which decodes the binary data back into voice or other analogue information. The 14 bit frame sync unique words are eliminated from the data stream applied to the PCM decoder 260 as a result of shifting them out of the 98 bit shift registers when the output gates are open. A unique word detector 250 is adapted to provide a sync detect output when the 14 bit shift register 248 is loaded with the frame sync unique word. The purpose of detecting the frame sync unique word is to maintain synchronism at the PCM decoder. Thus, the PCM decoder operates at the word rate of 8 Kc/sec. and the bit rate of 56 Kb/sec., which is identical to the word and bit rate of the PCM encoder. However, without proper synchronization between the PCM encoder on the transmit side and the PCM decoder on the receive side, there would be no way of knowing when a data word starts. By using a frame sync unique word, a pulse is generated every 14 words indicating the start of a word, and this may be used to synchronize the asynchronous clock 270 which generate the word and bit pulses to the PCM decoder 260.

As illustrated in FIG. 13*B*, the sync detect pulses are not applied directly to the asynchronous clock but are applied to a sync recovery unit 252 which generates the sync pulses. If there are no errors in the detection of the frame sync unique word, then the sync pulses at the output of the sync recovery unit 252 will be exactly in time with the sync detect pulses applied to the input of the sync recovery unit 252. However, it is possible that the unique word detector 250 will provide a false detection at a time other than the correct time or that it will fail to detect a frame sync unique word occurring at the proper time as the result of some error. Generally, the sync recovery unit operates as follows. It first detects a predetermined number of sync detect pulses occurring at properly spaced intervals. Following this, the sync recovery unit provides sync output pulses at the proper times regardless of errors in the time of detection of the sync detect pulses. However, if a predetermined number of successive sync detect signals are not received by the sync recovery unit, then it stops automatically providing the sync pulses to the asynchronous clock 270. The sync pulses also control a flip-flop 254, which may be of the JK type, whose outputs control the alternation of the 98 bit shift registers 256 and 258.

Figure 14:
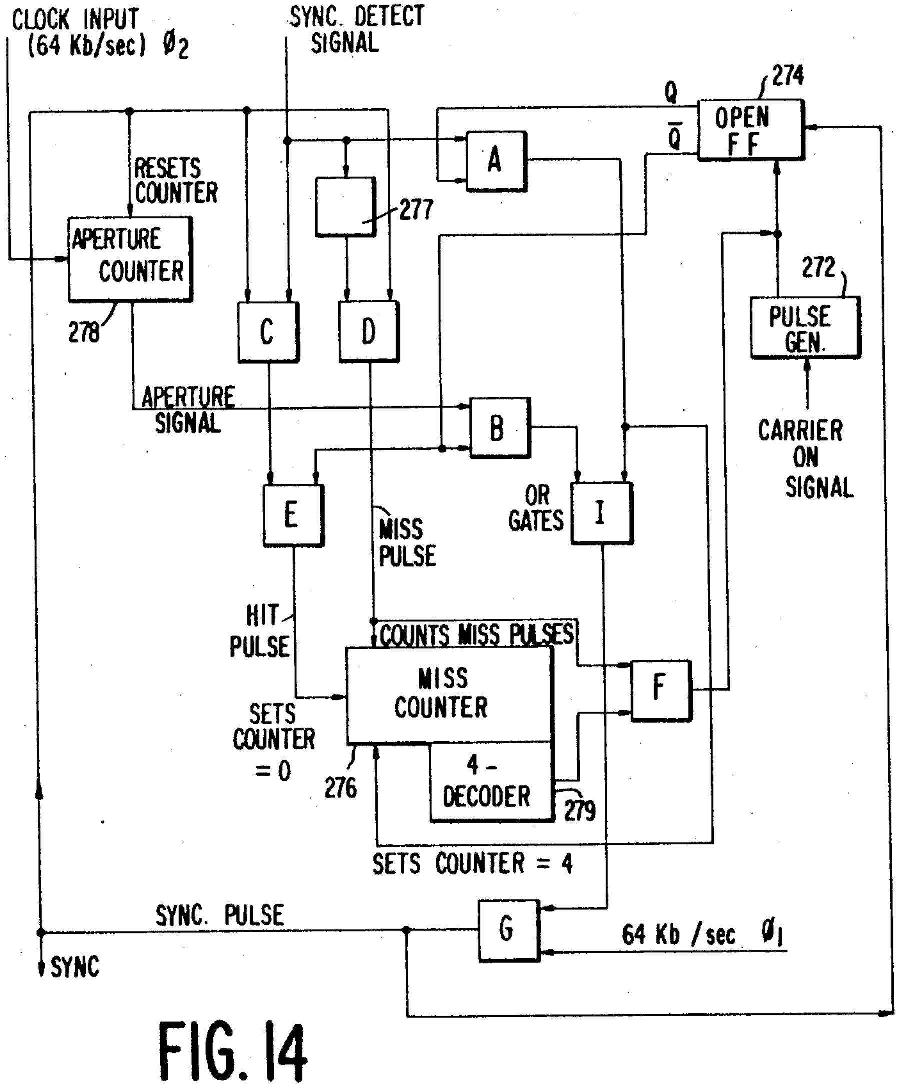
FIG. 14 is a block diagram illustrating a synchronous recovery unit which is useful in the receive channel unit of FIG. 13*b*.

A specific example of logic for implementing the sync recovery unit 252 is illustrated in FIG. 14. As soon as the PSK demodulator 246 (FIG. 13*B*) locks onto the incoming carrier frequency, a carrier on signal (not shown in FIG. 13*B*) energizes pulse generator 272 which in turn sets the open flip-flop 274 to the Q = 1 state and $\bar{Q}$ = 0 state thus enabling AND gate A and disabling AND gate B. The first occurring sync detect signal from the unique word detector 250 cannot pass through gates C and D since no output from gate G has occurred. The first sync detect signal does pass through gate A since Q of flip-flop 274 has enabled that gate. The output of gate A then passes through OR gate I and its output is then gated at G resulting in a sync pulse output from the sync recovery unit. The output from gate A also sets a miss counter 276 to a count of 4. A decoder 279 provides one input to gate F whenever the miss counter 276 contains a count of 4.

The derived sync pulse resets to 0 an aperture counter 278 which then commences counting the correct number of bits until the next sync detect signal should occur. In the specific example described herein, that would be after 112 bit pulses are counted. (Note that gate G and the aperture counter 278 receive different phases of the 64 Kb/sec. clock pulses, thereby insuring that the first pulse counted by aperture counter 278 is not in coincidence with the reset pulse.) At this time, the aperture counter emits an output aperture pulse which should be in synchronization with the incoming sync detect signal provided that no errors have occurred due to false detection of a unique word or misdetection of a unique word. The sync pulse also resets the open flip-flop 274 so that Q = 0 and $\bar{Q}$ = 1.

The aperture pulse from aperture counter 278 is passed through gates B and I to gate G where it is gated with the properly phased clock pulse to generate a second derived sync pulse. This output again resets the aperture counter and is also compared at gates C and D with the second incoming sync detect signal. If a sync detect signal is present at this time, gate C will be enabled and the output therefrom will pass through gate E to set the miss counter to 0. When the miss counter goes to 0, the sync recovery unit moves from the open aperture mode to the closed aperture mode.

If there was no sync detect pulse present when the sync pulse was generated at the output of gate G, gate D will be enabled by the sync pulse and the output from inverter 277 to transmit one count pulse to the miss counter. If the sync recovery unit is still in the open aperture mode, with the miss counter preset to the count of 4, the output from gate D will pass through gate F and reset the open flip-flop 274 to the Q= 1 and $\overline{Q}$ =0 state, thus initializing the synchronizing process. However, if 2 sync detect pulses appear with the proper time spacing, the miss counter will be set to 0 and the sync recovery unit will enter the closed aperture mode. Once the unit enters the closed aperture mode it will provide sync output pulses at the proper times regardless of whether there is a false detection of a unique word or a misdetection of a unique word. However, during the time that the sync pulses are automatically generated, they are also continuously being compared in time to the arriving sync detect signals. Every time a sync detect signal does not coincide with a generated sync pulse (as the result of a misdetection) gate D will be enabled and the miss counter will be advanced one count. Also, every time that a sync pulse and a sync detect pulse do coincide, gates C and E will be enabled thus resetting the miss counter to 0. On the fifth successive misdetection, gate F will be enabled thus resetting flip-flop 274 and throwing the sync detect unit back into the open aperture mode.

The invention described above includes an improved method of communication between stations via a satellite relay. Communications is provided via frequency division multiplexing and the satellite channels and not preassigned between any designated end points. Instead, all satellite channels are available to all stations on a first come, first serve demand basis. One of the satellite channels is used specifically for the purpose of channel routing control and all stations in the pool send a burst of routing information via the latter channel in a TDM mode.

While the invention has been particularly shown and described with reference to preferred embodiments thereof, it will be understood by those skilled in the art that various changes in form and details may be made therein without departing from the spirit and scope of the invention.

We claim:

1. A method of providing communication between stations through a relay via selected channels from a pool of FDM channels available on a demand assigned basis to all stations in a group of stations, comprising, at one station, the steps of:
   a. periodically transmitting bursts of FDM channel routing information via a TDM channel common to all stations in said pool, said routing information including information about FDM channels used by and requested by said one station,
   b. receiving via said TDM channel, bursts of channel routing information from all operating stations in said pool,
   c. storing the availability condition of said pool of channels and updating said storage in accordance with the information received via said TDM channel, and
   d. selecting an available FDM channel for transmission to and an available FDM channel for reception from a selected remote station.

2. The method as claimed in claim 1 wherein the step of selecting an available FDM channel for transmission to said selected remote station comprises:
   a. sending a request for a channel presently stored as being available and an identification of said selected remote station as the addressee via said transmitted burst,
   b. receiving and detecting said last mentioned burst containing said request and addressee information,
   c. checking the availability of said requested channel at the time of detection of said request, and
   d. seizing said requested channel after said checking step if said requested channel is available at the time of said checking step.

3. The method as claimed in claim 2 wherein said step of selecting an available FDM channel for reception comprises:
   a. detecting information in a TDM burst from said selected remote station that confirms receipt of said request information and names a second available channel, and
   b. receiving and extracting information carried by said second available channel.

4. The method as claimed in claim 2 wherein said relay is a satellite relay and wherein the step of seizing said requested channel comprises, transmitting data via said requested channel.

5. The method as claimed in claim 4 wherein the step of selecting an available FDM channel for reception comprises detecting information received on said latter FDM channel.

6. The method as claimed in claim 1 wherein the step of selecting comprises:
   a. detecting in a TDM burst received from said selected remote station information of a request for a channel naming said one station as the addressee,
   b. checking the availability of said requested channel at the time of detection of said request,
   c. detecting information transmitted via said requested channel if available at the time of checking, and
   d. transmitting information via a different available channel.

7. The method as claimed in claim 5 further comprising the steps of:
   a. detecting in a TDM burst from an initiating remote station information of a request for a channel naming said one station as the addressee,
   b. checking the availability of said requested channel at the time of detection of said request,
   c. detecting information received via said latter mentioned requested FDM channel if available at the time of checking, and
   d. transmitting information via a different available channel.

8. The method as claimed in claim 7 further comprising the step of sending via said transmitted TDM burst information confirming the acceptance of said last mentioned request and naming said initiating remote station as the addressee.

9. The method as claimed in claim 8 wherein the step of transmitting information via an FDM channel comprises:
   a. generating a carrier frequency corresponding to said FDM channel,
   b. modulating said carrier frequency with said information to form a modulated carrier, and
   c. up-converting said modulated carrier frequency to a modulated frequency in a range detectable by said relay.

10. The method as claimed in claim 9 wherein the step of detecting information received via an FDM channel comprises:
   a. receiving modulated frequencies in the range relayed by said relay,
   b. down converting said latter frequencies into carrier frequencies corresponding to said FDM channels, and
   c. extracting the modulated information from the carrier frequency corresponding to said FDM channel.

11. The method as claimed in claim 10 wherein the step of extracting the modulated information from said carrier frequency comprises:
   a. generating a mixer frequency differing from said carrier frequency by a predetermined difference frequency,
   b. mixing said mixer frequency with the said down converted carrier frequencies to form mixer component frequencies, and
   c. demodulating the mixer component frequency that is equal to said predetermined frequency difference.

12. The method as claimed in claim 11 wherein the step of modulating a carrier frequency with information to form a modulated carrier comprises:
   a. generating a digital representation of said information forming a train of digital data,
   b. periodically inserting in said train of digital data a unique code word representing a sync word, and
   c. phase shift key (PSK) modulating said carrier frequency with said train of digital data including said sync word.

13. The method of claimed in claim 12 wherein the step of demodulating the mixer component frequency corresponding to said difference frequency comprises:
   a. phase shift key (PSK) demodulating said difference frequency to form demodulated digital data, b. detecting a unique code word corresponding to said sync word in said demodulated data, c. converting the information in said demodulated digital data back into its original form, and d. synchronizing the conversion in accordance with the time of detection of sync words.

14. The method as claimed in claim 1 wherein the step of transmitting bursts comprises:

a. periodically generating channel routing information, b. detecting a received TDM burst from a master station, c. synchronizing the time of transmission of said transmitted burst in accordance with the time of detection of said master station TDM burst, and d. transmitting said periodically generated routing information via said transmitted TDM burst.

15. The method as claimed in claim 14 wherein the step of synchronizing the time of transmission comprises:

a. generating, in response to the detection of said master station TDM burst, a signal occuring at a time representing the proper time of arrival of said one station's own TDM burst, b. detecting the time of receipt of said one station's own TDM burst, and c. varying the burst transmission time in accordance with the difference between the proper time of arrival and the actual time of arrival of said one station's TDM burst.

16. The method as claimed in claim 13 wherein the step of transmitting bursts comprises:

a. periodically generating channel routing information, b. detecting a received TDM burst from a master station, c. synchronizing the time of transmission of said transmitted burst in accordance with the time of detection of said master station TDM burst, and d. transmitting said periodically generated routing information via said transmitted TDM burst.

17. The method as claimed in claim 16 wherein the step of synchronizing the time of transmission comprises:

a. generating, in response to the detection of said master station TDM burst, a signal occurring at a time representing the proper time of arrival of said one station's own TDM burst, b. detecting the time of receipt of said one station's own TDM burst, and c. varying the burst transmission time in accordance with the difference between the proper time of arrival and the actual time of arrival of said one station's TDM burst.